(12) United States Patent
Takano

(10) Patent No.: US 10,707,978 B2
(45) Date of Patent: *Jul. 7, 2020

(54) APPARATUS FOR WIRELESS COMMUNICATION

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,288

(22) Filed: Apr. 26, 2019

(65) Prior Publication Data

US 2019/0253161 A1 Aug. 15, 2019

Related U.S. Application Data

(63) Continuation of application No. 15/542,090, filed as application No. PCT/JP2016/054303 on Feb. 15, 2016, now Pat. No. 10,305,612.

(51) Int. Cl.
| | |
|---|---|
| *H04B 7/06* | (2006.01) |
| *H04B 17/309* | (2015.01) |
| *H04W 16/28* | (2009.01) |
| *H04B 7/08* | (2006.01) |
| *H04B 7/0452* | (2017.01) |

(Continued)

(52) U.S. Cl.
CPC ......... *H04B 17/309* (2015.01); *H04B 7/0452* (2013.01); *H04B 7/0695* (2013.01); *H04B 7/088* (2013.01); *H04L 5/0048* (2013.01); *H04W 16/28* (2013.01); *H04B 7/0617* (2013.01);

(Continued)

(58) Field of Classification Search
CPC .... H04B 17/309; H04B 7/0695; H04B 7/088; H04B 7/0452; H04B 7/0626; H04B 7/0617; H04L 5/0048; H04L 5/0023; H04L 25/0226; H04W 16/28

See application file for complete search history.

(56) References Cited

U.S. PATENT DOCUMENTS 10,305,612 B2 * 5/2019 Takano ................ H04W 16/28
2013/0163544 A1 6/2013 Lee et al.

(Continued)

FOREIGN PATENT DOCUMENTS

| JP | 2014-53811 A | 3/2014 |
|---|---|---|
| JP | 2014-64294 A | 4/2014 |

(Continued)

OTHER PUBLICATIONS

Samsung, "Configuration and control signaling for Rel. 13 FD-MIMO," 3GPP TSG RAN WG1 Meeting #80 R1-150380, Feb. 13, 2015, (5 pages).

(Continued)

*Primary Examiner* — Kenneth T Lam
(74) *Attorney, Agent, or Firm* — Xsensus LLP

(57) ABSTRACT

[Object] To suppress the overhead related to the transmission of the reference signal when beamforming is performed.
[Solution] Provided is an apparatus, including: an acquiring unit configured to acquire antenna-related information related to an antenna port allocated to a directional beam for transmission by the directional beam; and a notifying unit configured to notify a terminal apparatus of the antenna-related information.

18 Claims, 31 Drawing Sheets

(51) Int. Cl.
    *H04L 5/00*     (2006.01)
    *H04L 25/02*    (2006.01)
(52) U.S. Cl.
    CPC .......... *H04B 7/0626* (2013.01); *H04L 5/0023* (2013.01); *H04L 25/0226* (2013.01)

(56) References Cited

U.S. PATENT DOCUMENTS

| | | | |
|---|---|---|---|
| 2015/0049824 A1* | 2/2015 | Kim | H04B 7/0456 375/267 |
| 2015/0124736 A1 | 5/2015 | Ko et al. | |
| 2015/0222340 A1 | 8/2015 | Nagata et al. | |
| 2016/0105265 A1 | 4/2016 | Wang et al. | |
| 2016/0142189 A1 | 5/2016 | Shin et al. | |
| 2016/0242060 A1 | 8/2016 | Kakishima et al. | |
| 2017/0033856 A1 | 2/2017 | Su et al. | |
| 2018/0205437 A1 | 7/2018 | Kim et al. | |

FOREIGN PATENT DOCUMENTS

| | | |
|---|---|---|
| JP | 2014-204305 A | 10/2014 |
| JP | 2015-502695 A | 1/2015 |
| WO | 2014/038321 A1 | 3/2014 |

OTHER PUBLICATIONS

International Search Report and Written Opinion dated Apr. 26, 2016 in PCT/JP2016/054303 filed Feb. 15, 2016.
CMCC, "DMRS Design for Higher Order MU-MIMO", 3GPP TSG-RAN WG1 #80, R1-150499, Feb. 13, 2015, http://www.3gpp.org/ftp/tsg-ran/WG1_RL1/TSGR1_80/Docs/R1-150449.zip.
Japanese Office Action dated Feb. 4, 2020 in Japanese Application No. 2017-507593.

* cited by examiner

FIG. 11

|              | PORT A | PORT B |
|--------------|--------|--------|
| BEAM 0 (301) | ◯      |        |
| BEAM 1 (303) |        | ◯      |
| BEAM 2 (305) | ◯      |        |
| BEAM 3 (307) | ◯      |        |

FIG. 12

| | DMRS RESOURCE FOR PORT A (51) | DMRS RESOURCE FOR PORT B (53) |
|---|---|---|
| BEAM 0 (301) | DMRS | BLANK |
| BEAM 1 (303) | BLANK | DMRS |
| BEAM 2 (305) | DMRS | DATA (PORT A) |
| BEAM 3 (307) | DMRS | DATA (PORT A) |

FIG. 14

|              | PORT A | PORT B | PORT C |
|--------------|--------|--------|--------|
| BEAM 0 (311) |   ◯    |        |        |
| BEAM 1 (313) |        |   ◯    |        |
| BEAM 2 (315) |        |        |   ◯    |

FIG. 15

|  | DMRS RESOURCE FOR PORT A | DMRS RESOURCE FOR PORT B | DMRS RESOURCE FOR PORT C |
|---|---|---|---|
| BEAM 0 (301) | DMRS | BLANK | BLANK |
| BEAM 1 (303) | BLANK | DMRS | BLANK |
| BEAM 2 (305) | BLANK | BLANK | DMRS |

FIG. 16

|              | PORT A | PORT B |
|--------------|--------|--------|
| BEAM 0 (311) | ◯      |        |
| BEAM 1 (313) |        | ◯      |
| BEAM 2 (315) | ◯      |        |

☐ BEAM TO WHICH ANTENNA PORT A IS ASSIGNED
▨ BEAM TO WHICH ANTENNA PORT B IS ASSIGNED

FIG. 20

| | PORT A | PORT B | PORT C |
|---|---|---|---|
| BEAM 0 (331) | ○ | | |
| BEAM 1 (333) | | ○ | |
| BEAM 2 (335) | | | ○ |
| BEAM 3 (337) | ○ | | |
| BEAM 4 (339) | | ○ | |
| BEAM 5 (341) | | | ○ |

FIG. 21

| | DMRS RESOURCE FOR PORT A | DMRS RESOURCE FOR PORT B | DMRS RESOURCE FOR PORT C |
|---|---|---|---|
| BEAM 0 (331) | DMRS | BLANK | BLANK |
| BEAM 1 (333) | DMRS | DMRS | BLANK |
| BEAM 2 (335) | DMRS | BLANK | DMRS |
| BEAM 3 (337) | DMRS | BLANK | BLANK |
| BEAM 4 (339) | DMRS | DMRS | BLANK |
| BEAM 5 (341) | DMRS | BLANK | DMRS |

FIG. 23

|  | PORT A | PORT B | PORT C | PORT D |
|---|---|---|---|---|
| BEAM 0 (351) | ○ | | | |
| BEAM 1 (353) | | ○ | | |
| BEAM 2 (355) | | | ○ | |
| BEAM 3 (357) | ○ | | | |
| BEAM 4 (359) | | ○ | | |
| BEAM 5 (361) | | | ○ | |
| BEAM 6 (363) | | | | ○ |

FIG. 24

| | DMRS RESOURCE FOR PORT A (51) | DMRS RESOURCE FOR PORT B (53) | DMRS RESOURCE FOR PORT C (55) | DMRS RESOURCE FOR PORT D (57) |
|---|---|---|---|---|
| BEAM 0 (351) | DMRS | BLANK | BLANK | DATA (PORT A) |
| BEAM 1 (353) | DMRS | DMRS | BLANK | DATA (PORT B) |
| BEAM 2 (355) | DMRS | BLANK | DMRS | DATA (PORT C) |
| BEAM 3 (357) | DMRS | BLANK | BLANK | BLANK |
| BEAM 4 (359) | DMRS | DMRS | BLANK | BLANK |
| BEAM 5 (361) | DMRS | BLANK | DMRS | BLANK |
| BEAM 6 (363) | DMRS | BLANK | BLANK | DMRS |

APPARATUS FOR WIRELESS COMMUNICATION

CROSS-REFERENCE TO RELATED APPLICATIONS

The present application is a continuation of U.S. application Ser. No. 15/542,090, filed Jul. 7, 2017, which is based on PCT filing PCT/JP2016/054303, filed Feb. 15, 2016, and claims priority to JP 2015-061307, filed Mar. 24, 2015, the entire contents of each are incorporated herein by reference.

TECHNICAL FIELD

The present disclosure relates to apparatuses.

BACKGROUND ART

In the Third Generation Partnership Project (3GPP), various techniques for improving the capacity of a cellular system are currently studied in order to accommodate explosively increasing traffic. It is also envisaged that the required capacity will become about 1000 times the current capacity in the future. Techniques such as multi-user multi-input multiple-input multiple-output (MU-MIMO), coordinated multipoint (CoMP), and the like could increase the capacity of a cellular system by a factor of as low as less than ten. Therefore, there is a demand for an innovative technique.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO, massive MIMO, or free dimension (FD)-MIMO. By such beamforming, the half-width of a beam is narrowed. In other words, a sharp beam is formed. Also, if the large number of antenna elements are arranged in a plane, a beam aimed in a desired three-dimensional direction can be formed.

For example, Patent Literatures 1 to 3 disclose techniques applied when a directional beam aimed in a three-dimensional direction is used.

CITATION LIST

Patent Literature

Patent Literature 1: JP 2014-204305A
Patent Literature 2: JP 2014-53811A
Patent Literature 3: JP 2014-64294A

DISCLOSURE OF INVENTION

Technical Problem

When large-scale MIMO (that is, massive MIMO or FD-MIMO) is employed, for example, an antenna having a large number of antenna elements (for example, about 64 to hundreds of antenna elements) is used. As the number of antenna elements increases, the number of antenna ports is also expected to increase explosively. For this reason, for transmission of a reference signal (for example, a demodulation reference signal (DMRS)) using a plurality of antenna ports, a plurality of orthogonal resources are prepared, and thus the overhead related to the transmission of the reference signal may be increased. The increase in the number of antenna ports and the overhead occur even when beamforming is performed.

In this regard, it is desirable to provide a mechanism capable of suppressing the overhead related to the transmission of the reference signal when beamforming is performed.

Solution to Problem

According to the present disclosure, there is provided an apparatus, including: an acquiring unit configured to acquire antenna-related information related to an antenna port allocated to a directional beam for transmission by the directional beam; and a notifying unit configured to notify a terminal apparatus of the antenna-related information.

Further, according to the present disclosure, there is provided an apparatus, including: an acquiring unit configured to acquire antenna-related information related to an antenna port allocated to a directional beam for transmission by the directional beam; and a reception processing unit configured to perform a reception process on the basis of the antenna-related information.

Advantageous Effects of Invention

As described above, according to the present disclosure, it is possible to suppress the overhead related to the transmission of the reference signal when beamforming is performed. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is an explanatory diagram for describing an example of antenna ports allocated to respective directional beams.

FIG. 12 is an explanatory diagram for describing an example of transmission by respective beams in resources for transmitting a reference signal.

FIG. 14 is an explanatory diagram for describing an example of antenna ports allocated to respective directional beams in accordance with another technique (a technique of preparing a different antenna port for each directional beam).

FIG. 15 is an explanatory diagram for describing an example of transmission by respective beams in another technique.

FIG. 16 is an explanatory diagram for describing an example of antenna ports allocated to respective directional beams by a first technique.

FIG. 20 is an explanatory diagram for describing an example of antenna ports allocated to respective directional beams by a third technique.

FIG. 21 is an explanatory diagram for describing an example of transmission by respective beams in a third technique.

FIG. 23 is an explanatory diagram for describing an example of antenna ports allocated to respective directional beams by a fourth technique.

FIG. 24 is an explanatory diagram for describing an example of transmission by respective beams in a fourth technique.

MODE(S) FOR CARRYING OUT THE INVENTION

Figure 1:
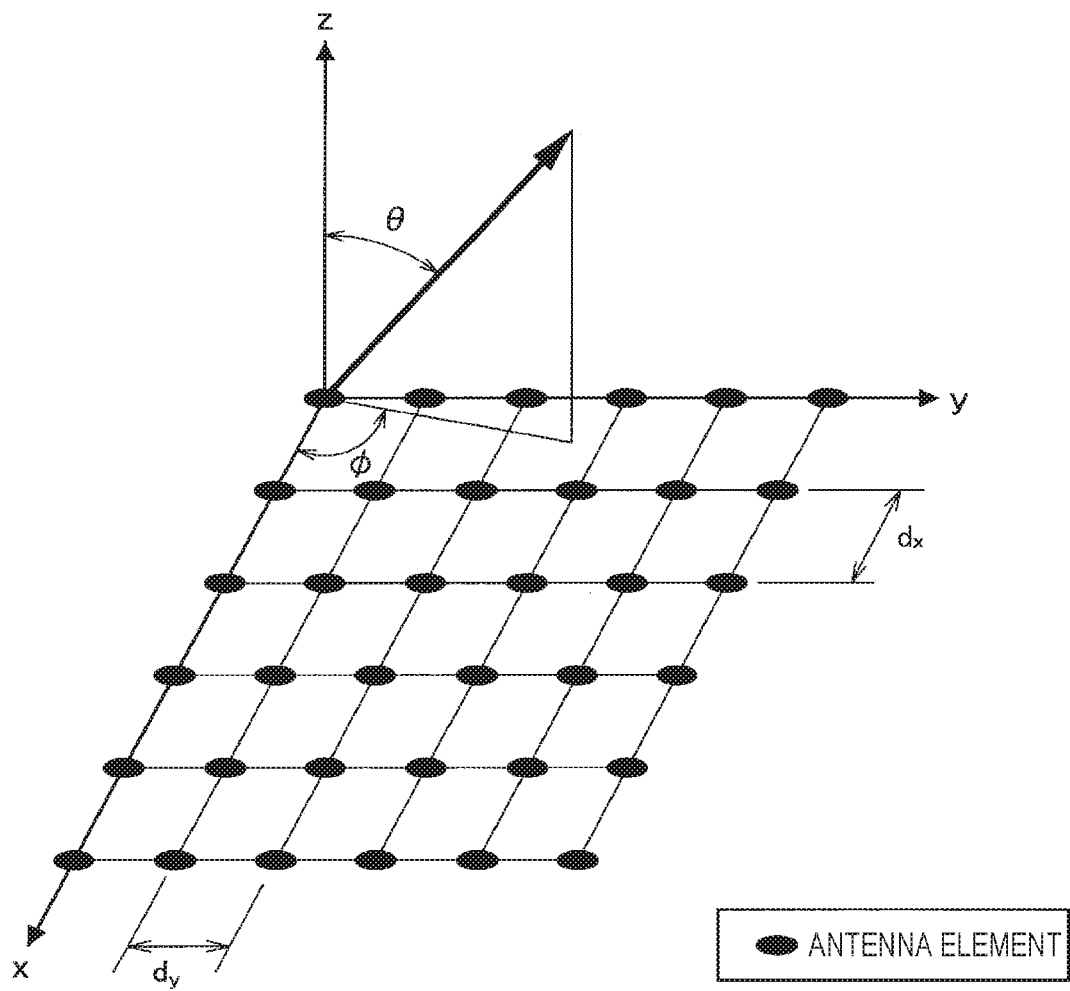
FIG. 1 is a diagram for describing a weight set for large-scale MIMO beamforming.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. Introduction
1.1. Technology related to beamforming
1.2. Technical problems
2. Schematic configuration of system
3. Configuration of each apparatus
3.1. Configuration of base station
3.2. Configuration of terminal apparatus
4. Technical features
5. Processing flow
6. Application examples
6.1. Application examples for base station
6.2. Application examples for terminal apparatus
7. Conclusion

1. INTRODUCTION

First, a technique related to beamforming and technical features related to an embodiment of the present disclosure will be described with reference to FIGS. 1 to 6.

1.1. Technology Related to Beamforming

A technique related to beamforming will be described with reference to FIGS. 1 to 6.

(1) Necessity of Large-Scale MIMO

In the 3GPP, various techniques for improving the capacity of a cellular system are currently studied in order to accommodate explosively increasing traffic. It is envisaged that the required capacity will become about 1000 times the current capacity in the future. Techniques such as MU-MIMO, CoMP, and the like could increase the capacity of a cellular system by a factor of as low as less than ten. Therefore, there is a demand for an innovative technique.

Release 10 of the 3GPP specifies that evolved eNode B is equipped with eight antennas. Therefore, the antennas can provide eight-layer MIMO in the case of single-user multi-input multiple-input multiple-output (SU-MIMO). Eight-layer MIMO is a technique of spatially multiplexing eight separate streams. Alternatively, the antennas can provide four-user two-layer MU-MIMO.

User equipment (UE) has only a small space for accommodating an antenna, and limited processing capability, and therefore, it is difficult to increase the number of antenna elements in the antenna of UE. However, recent advances in antenna mounting technology have allowed eNode B to accommodate a directional antenna including about 100 antenna elements.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO or massive MIMO. By such beamforming, the half-width of a beam is narrowed. In other words, a sharp beam is formed. Also, if the large number of antenna elements are arranged in a plane, a beam aimed in a desired three-dimensional direction can be formed. For example, it has been proposed that, by forming a beam aimed at a higher position than that of a base station (e.g., a higher floor of a high-rise building), a signal is transmitted to a terminal apparatus located at that position.

In typical beamforming, it is possible to control a direction of a beam in the horizontal direction. Therefore, the typical beamforming can be regarded as two-dimensional beamforming. On the other hand, in beamforming of large-scale MIMO (or massive MIMO), it is possible to control a direction of a beam in the vertical direction in addition to the horizontal direction. In other words, it is possible to form a three-dimensional beam having desired directivity in the horizontal direction and the vertical direction. Therefore, beamforming of large-scale MIMO can be regarded as 3-dimensional beamforming. For example, a three-dimensional beam can be formed using antenna elements which are arranged two dimensionally.

Note that the increase in the number of antennas allows for an increase in the number of MU-MIMO users. Such a technique is another form of the technique called large-scale MIMO or massive MIMO. Note that when the number of antennas in UE is two, the number of spatially separated streams is two for a single piece of UE, and therefore, it is more reasonable to increase the number of MU-MIMO users than to increase the number of streams for a single piece of UE.

(2) Weight Set

A set of weight for beamforming are represented by a complex number (i.e., a set of weight coefficients for a plurality of antenna elements). An example of a weight set particularly for large-scale MIMO beamforming will now be described with reference to FIG. 1.

FIG. 1 is a diagram for describing a weight set for large-scale MIMO beamforming. FIG. 1 shows antenna elements arranged in a grid pattern. FIG. 1 also shows two orthogonal axes x and y in a plane in which the antenna elements are arranged, and an axis z perpendicular to the plane. Here, the direction of a beam to be formed is, for example, represented by an angle phi (Greek letter) and an angle theta (Greek letter). The angle phi (Greek letter) is an angle between an xy-plane component of the direction of a beam and the x-axis. Also, the angle theta (Greek letter) is an angle between the beam direction and the z-axis. In this case, for example, the weight coefficient $V_{m,n}$ of an antenna element which is m-th in the x-axis direction and n-th in the y-axis direction is represented as follows.

$$V_{m,n}(\theta, \varphi, f) = \exp\left(j2\pi\frac{f}{c}\{(m-1)d_x\sin(\theta)\cos(\varphi) + (n-1)d_y\sin(\theta)\sin(\varphi)\}\right)$$ [Math. 1]

In formula (1), f is a frequency, and c is the speed of light. Also, j is the imaginary unit of a complex number. Also, $d_x$ is an interval between each antenna element in the x-axis direction, and $d_y$ is an interval between each antenna element in the y-axis direction. Note that the coordinates of an antenna element are represented as follows.

$$x=(m-1)d_x, y=(n-1)d_y$$ [Math. 2]

A weight set for typical beamforming (two-dimensional beamforming) can be split into a weight set for obtaining directivity in the horizontal direction and a weight set for phase adjustment of multilayer MIMO (for example, dual layer MIMO) (for example, a weight set for phase adjustment between two antenna sub arrays corresponding to different polarized waves). On the other hand, a weight set for beamforming of large-scale MIMO (three-dimensional beamforming) can be split into a first weight set for obtaining directivity in the horizontal direction, a second weight set for obtaining directivity in the vertical direction, and a third weight set for phase adjustment of multilayer MIMO (for example, dual layer MIMO). For example, the third weight set is a weight set for phase adjustment between sub arrays. Further, when transmission is performed in a single layer, the weight set for phase adjustment of multilayer MIMO (for example, dual layer MIMO) may not be included.

(3) Reception of Signal

For demodulation of a signal transmitted over a directional beam, an evolved Node B (eNB) transmits a DMRS along with a data signal in the downlink. The DMRS is a sequence known to the UE and is multiplied by a set of weight coefficients for beamforming (which is the same as a set of weight coefficients multiplied by a data signal). The UE restores a phase and an amplitude of the data signal on the basis of a reception result of the DMRS, and demodulates and decodes the data signal.

(4) DMRS (a) Difference of CRS and CSI-RS with DMRS

In LTE, in addition to the DMRS, there are reference signals such as a cell-specific reference signal (CRS) and a channel state information reference signal (CSI-RS). The CRS and the CSI-RS are not used for demodulation of the data signal but are mainly used for measuring a channel quality. Specifically, the CRS is used for cell selection, and the CSI-RS is used for determining a modulation scheme. Therefore, according to the current standard, the CRS and the CSI-RS are not transmitted by a directional beam but transmitted by non-directional radio waves.

Note that the CRS and/or the CSI-RS may be transmitted by a directional beam. Depending on a system design concept at that time, the CRS and/or the CSI-RS is transmitted by the non-directional radio wave or is transmitted by the directional beam.

On the other hand, since the DMRS is transmitted for demodulation of the data signal transmitted by the directional beam, it is similarly transmitted by the directional beam.

Figure 2:
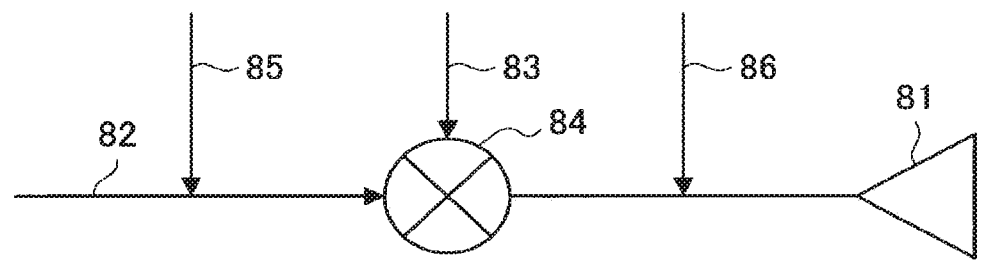
FIG. 2 is a diagram for describing a relationship between multiplication of weight coefficients and insertion of a reference signal.

An example of multiplication of the reference signal and the weight coefficient will be described with reference to FIG. 2. FIG. 2 is a diagram for describing the relationship between multiplication of weight coefficients and insertion (or mapping) of a reference signal. Referring to FIG. 2, a transmission signal 82 corresponding to each antenna element 81 is complex-multiplied by a weight coefficient 83 by a multiplier 84. Thereafter, the transmission signal 82 complex-multiplied by the weight coefficient 83 is transmitted from the antenna element 81. Also, a DR-MS 85 is inserted before the multiplier 84, and is complex-multiplied by the weight coefficient 83 by the multiplier 84. Thereafter, the DR-MS 85 complex-multiplied by the weight coefficient 83 is transmitted from the antenna element 81. Meanwhile, a CRS 86 (and a CSI-RS) is inserted after the multiplier 84. Thereafter, the CRS 86 (and the CSI-RS) is transmitted from the antenna element 81 without being multiplied by the weight coefficient 83.

(b) Example of Resources Used for DMRS Transmission

The DMRS is transmitted using a corresponding antenna port. Further, the DMRS is transmitted in resources associated with the corresponding antenna port. The resources indicate a combination of time/frequency resources and a code sequence. The resources associated with any one antenna port and the resources associated with another antenna port are orthogonal to each other. In other words, the resources associated with any one antenna port and the resources associated with another antenna port differ in at least one of the time/frequency resources and the code sequence. An example of resources in which the DMRS is transmitted will be described with reference to FIGS. 3 and 4.

Figure 3:
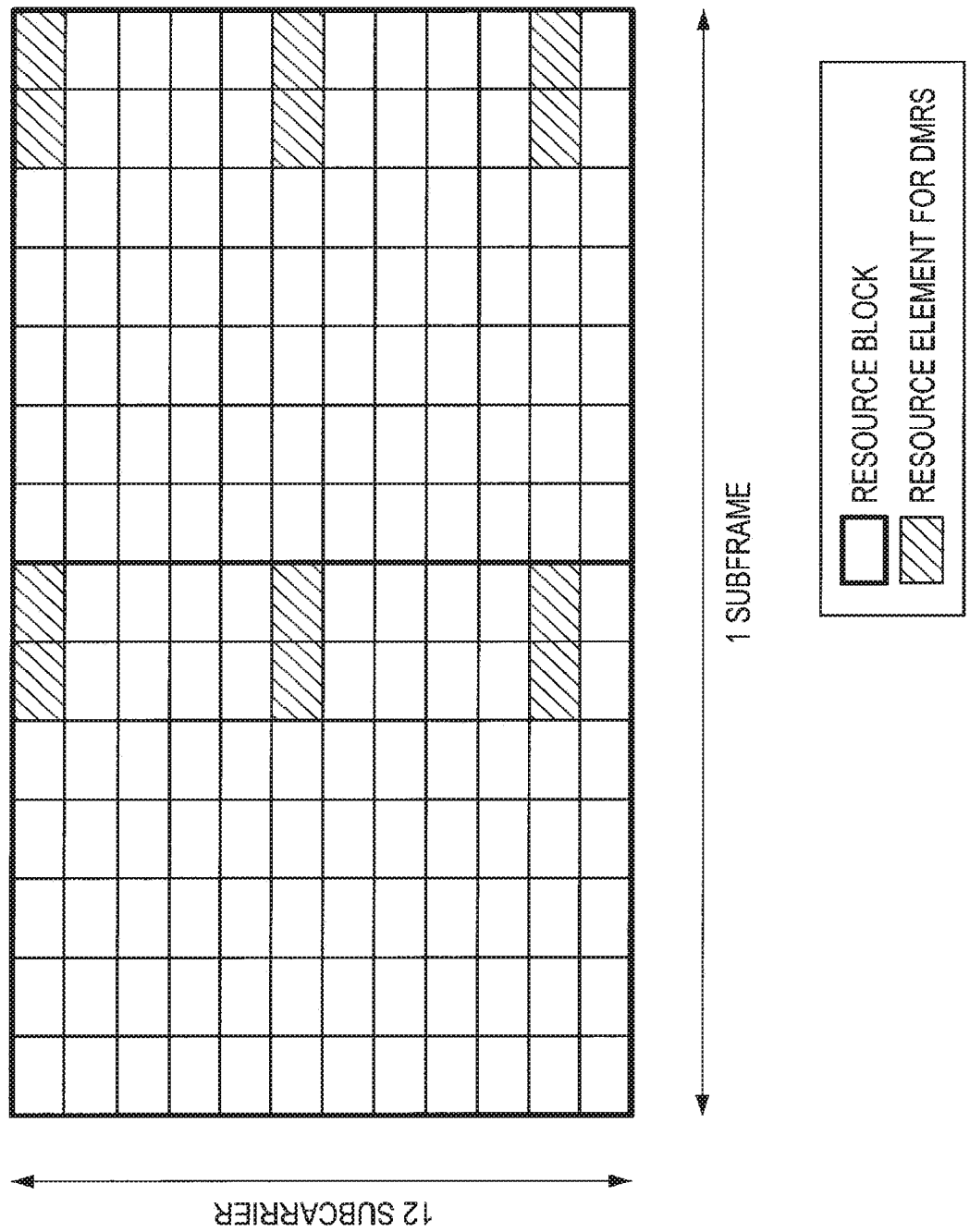
FIG. 3 is an explanatory diagram for describing an example of resources in which a DMRS is transmitted using antenna ports 7, 8, 11, and 13 in a transmission mode 9.

FIG. 3 is an explanatory diagram for describing an example of resources in which the DMRS is transmitted using antenna ports 7, 8, 11, and 13 in a transmission mode 9. Referring to FIG. 3, two resource blocks arranged in a time direction are illustrated. As illustrated in FIG. 3, for the antenna ports 7, 8, 11, and 13, twelve resource elements are prepared as the resource elements for the DMRS. The eNB uses the antenna ports 7, 8, 11, and 13 to transmit the DMRS through the resource elements. Particularly, in order to allocate orthogonal resources to antenna ports 7, 8, 11, and 13 (in a pseudo manner), the following code sequences are applied to the antenna ports 7, 8, 11, and 13:
antenna port 7: +1, +1, +1, +1
antenna port 8: +1, −1, +1, −1
antenna port 11: +1, +1, −1, −1
antenna port 13: +1, −1, −1, +1

Figure 4:
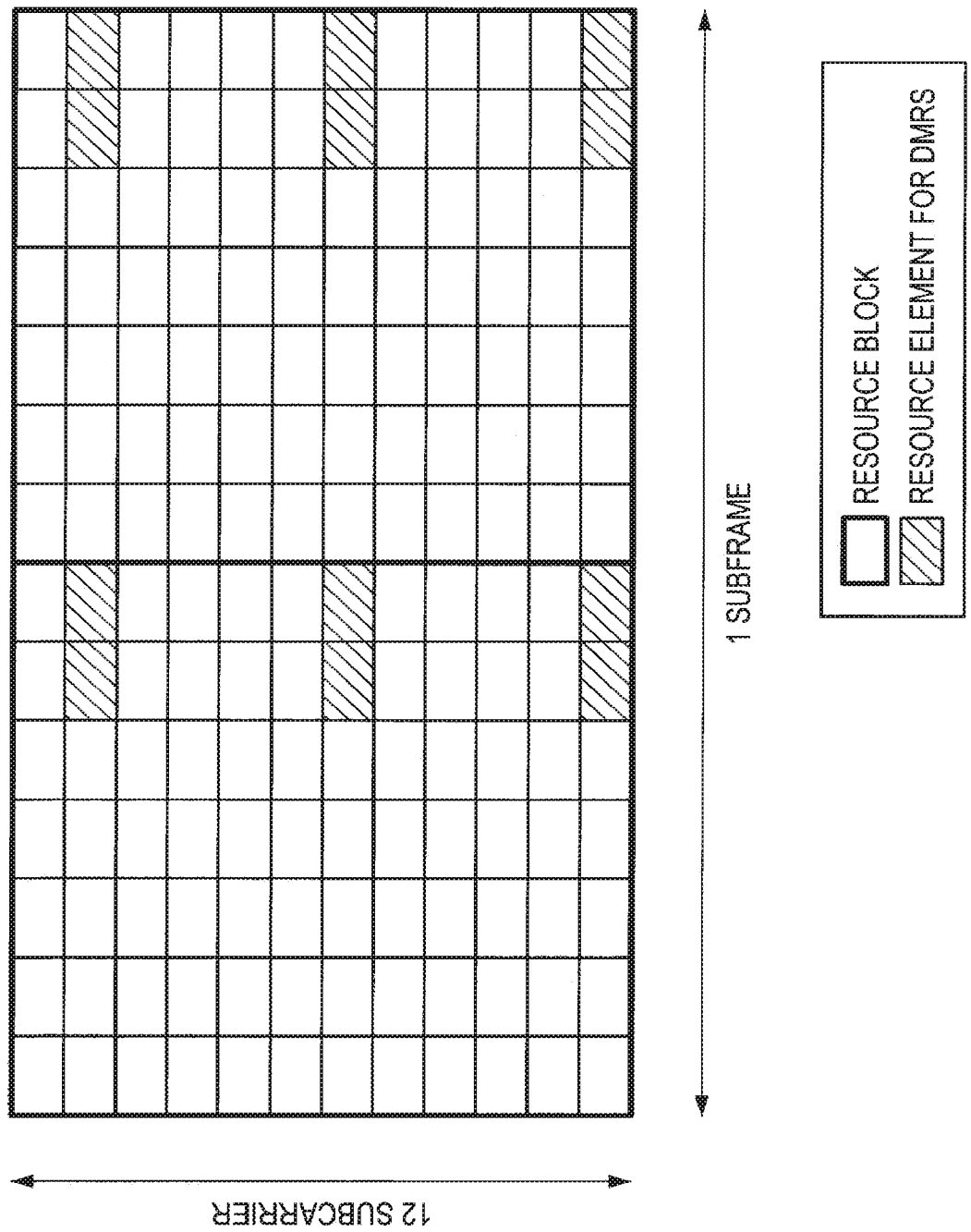
FIG. 4 is an explanatory diagram for describing an example of resources in which a DMRS is transmitted using antenna ports 9, 10, 12, and 14 in the transmission mode 9.

FIG. 4 is an explanatory diagram for describing an example of resources in which the DMRS is transmitted using the antenna ports 9, 10, 12, and 14 in the transmission mode 9. Referring to FIG. 4, two resource blocks arranged in the time direction are illustrated. As illustrated in FIG. 4, for the antenna ports 9, 10, 12, and 14, twelve resource elements are prepared as the resource elements for the DMRS. The eNB uses the antenna ports 9, 10, 12, and 14 to transmit the DMRS through the resource elements. The twelve resource elements illustrated in FIG. 4 are orthogonal to the twelve resource elements illustrated in FIG. 3 in terms of frequency. In other words, the resources associated with the antenna ports 9, 10, 12, and 14 are orthogonal to the resources associated with the antenna ports 7, 8, 11, and 13. Furthermore, in order to allocate orthogonal resources to the antenna ports 9, 10, 12, and 14 (in a pseudo manner), the following code sequences are applied to the antenna ports 9, 10, 12, and 14:

antenna port 9: +1, +1, +1, +1
antenna port 10: +1, −1, +1, −1
antenna port 12: −1, −1, +1, +1
antenna port 14: −1, +1, +1, −1

As described above, the resources associated with any one antenna port are orthogonal to the resources associated with another antenna port. For example, the UE including two antennas can receive signals from the eight antenna ports and calculate an 8×2 channel matrix.

(5) Antenna Port (a) Virtual Antenna

In LTE, instead of a physical antenna/antenna element, a virtual antenna such as an antenna port is prepared. The antenna port corresponds to one or more physical antennas or antenna elements, but a specific correspondence relation between the antenna port and the antenna/antenna element depends on an implementation and has a degree of freedom. For example, one antenna port may correspond to one antenna (for example, one normal antenna or one array antenna). Further, for example, one antenna port may correspond to one antenna element (or a plurality of antenna elements) included in an array antenna.

(b) Resources Associated with Antenna Port

As described above, for example, for a plurality of antenna ports, a plurality of orthogonal resources (a combination of time/frequency resources and a code sequence) are prepared and used for transmission of the DMRS. For example, the eNB transmits the DMRS in first resources using a first antenna port (for example, the antenna port 10) and transmits the DMRS in second resources orthogonal to the first resources using a second antenna port (for example, the antenna port 11).

(c) Reason for Preparing Orthogonal Resources

Since each antenna port corresponds to an antenna/antenna element located at a spatially different position, a spatially independent channel is obtained between the eNB and the UE. Before the orthogonal channel is obtained, it is necessary to estimate a channel characteristic on the basis of the reference signal (for example, the DMRS). Since it is difficult to estimate a channel characteristic when interference with the reference signal occurs, orthogonal resources (that is, different resources) are prepared for each antenna port so that interference does not occur between the reference signals transmitted using different antenna ports.

For example, the eNB includes two antennas (for example, virtually two antenna ports), and the UE includes two antennas as well. In this case, a channel matrix H (2×2) is calculated from a transfer function of 4 (2×2) channels. Then, a general inverse matrix of the channel matrix H is calculated, and two spatially independent channels are obtained by multiplying reception data by the general inverse matrix from the left side. Particularly, in order to properly calculate the channel matrix H, orthogonal resources (that is, different resources) are prepared for each of two antenna ports so that no interference occurs between the reference signals transmitted using the two antenna ports.

(6) Interference Between Directional Beams

In an environment in which the directional beam formed by the eNB is reflected, the directional beam may interfere with other directional beams that are close to the directional beam in the radiation direction due to the reflection by the directional beam. This point will be described with reference to FIGS. 5 and 6 using a specific example.

Figure 5:
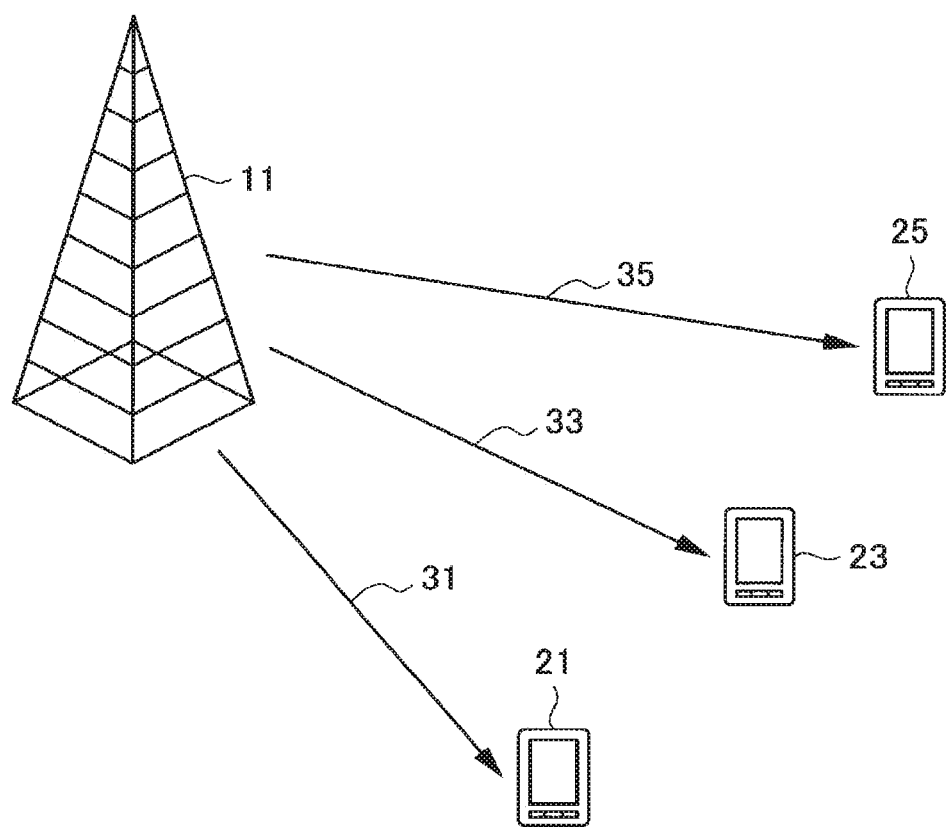
FIG. 5 is an explanatory diagram for describing an example of an environment in which a directional beam is not reflected.

FIG. 5 is an explanatory diagram for describing an example of an environment in which the directional beam is not reflected. Referring to FIG. 5, an eNB 11 and UEs 21, 23, and 25 are illustrated. For example, the eNB 11 forms a directional beam 31 for the UE 21, a directional beam 33 for the UE 23, and a directional beam 35 for the UE 25. In this example, the directional beams 31, 33, and 35 are not reflected, and interference does not occur among the directional beams 31, 33, and 35.

Figure 6:
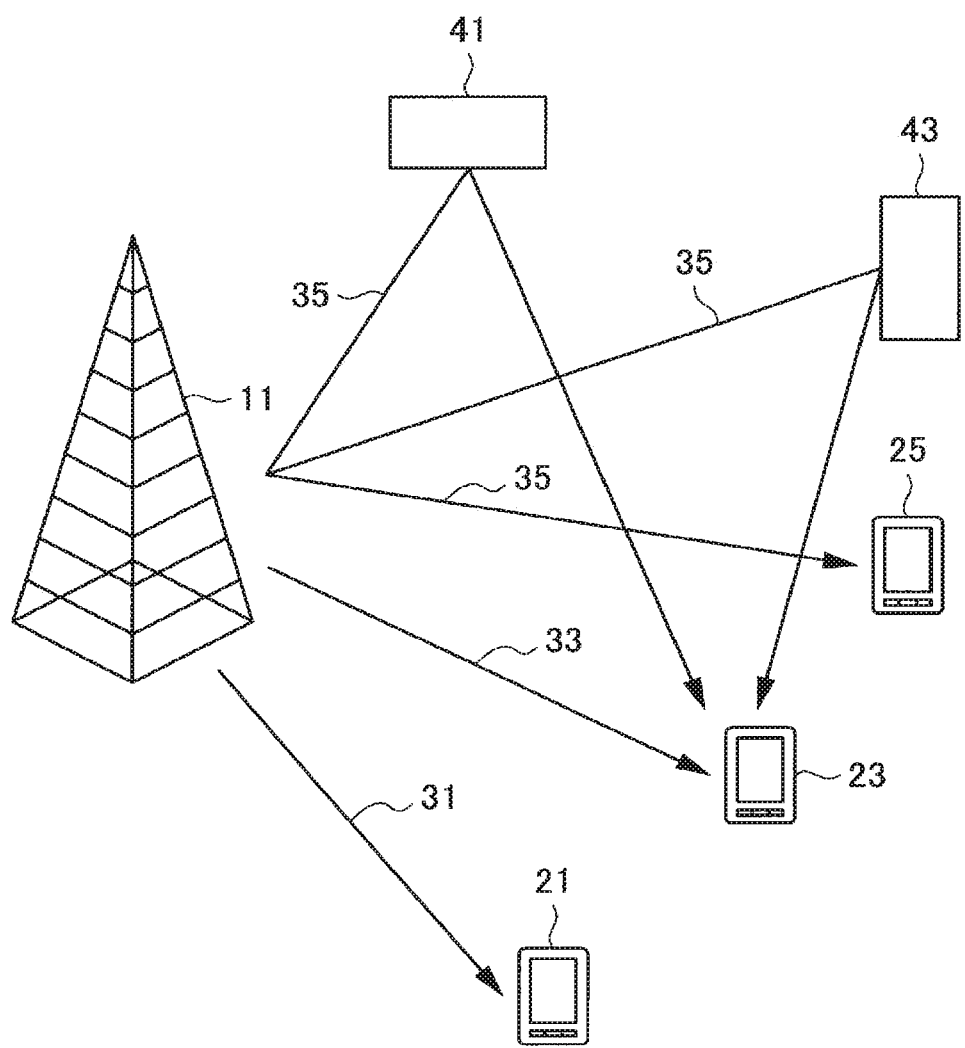
FIG. 6 is an explanatory diagram for describing an example of an environment in which a directional beam is reflected.

FIG. 6 is an explanatory diagram for describing an example of an environment in which the directional beam is reflected. Referring to FIG. 6, an eNB 11 and UEs 21, 23, and 25 are illustrated. In addition, obstacles 41 and 43 are illustrated. For example, the obstacles 41 and 43 are buildings. For example, the eNB 11 forms a directional beam 31 for the UE 21, a directional beam 33 for the UE 23, and a directional beam 35 for the UE 25. In this example, the directional beam 35 is reflected by the obstacles 41 and 43 and reaches the UE 23. Therefore, interference occurs between the directional beam 33 and the directional beam 35.

As described above, interference may occur between the directional beams due to the reflection, but a possibility of interference occurring between two directional beams having completely different radiation directions is considered to be low.

1.2. Technical Problems

Next, technical problems related to an embodiment of the present disclosure will be described.

When large-scale MIMO (that is, massive MIMO or FD-MIMO) is employed, for example, an antenna having a large number of antenna elements (for example, 64 to hundreds of antenna elements) is used. As the number of antenna elements increases, the number of antenna ports is also expected to increase explosively. For this reason, for transmission of a reference signal (for example, a DMRS) using a plurality of antenna ports, a plurality of orthogonal resources are prepared, and thus the overhead related to the transmission of the reference signal may be increased.

The increase in the number of antenna ports and the overhead occur even when beamforming is performed. More specifically, for example, when the beamforming is performed by the base station, if the radiation directions of the two directional beams are close to each other, interference may occur between the two directional beams due to reflection (particularly, when beamforming of large-scale MIMO is performed, a possibility of the occurrence of interference is considered to be high due to reflection). In this regard, for example, if different antenna ports are used for transmitting a signal through the two directional beams, a terminal apparatus may separate a reception signal into a signal transmitted by one directional beam and a signal transmitted by the other directional beam through a technique such as interference cancellation (for example, successive interference cancellation (SIC), parallel interference cancellation (PIC), or the like). Due to such advantages, a plurality of antenna ports can be used even when beamforming is performed. As a result, the overhead may be increased.

However, since a possibility of interference occurring between directional beams having greatly different radiation directions is low, the same antenna ports rather than different antenna ports may be used for transmission of a signal by the directional beam. If this point is considered, it is possible to prevent the number of antenna ports from being unnecessarily increased when beamforming is performed.

In this regard, it is desirable to provide a mechanism capable of suppressing the overhead related to the transmission of the reference signal when beamforming is performed.

2. SCHEMATIC CONFIGURATION OF SYSTEM

Figure 7:
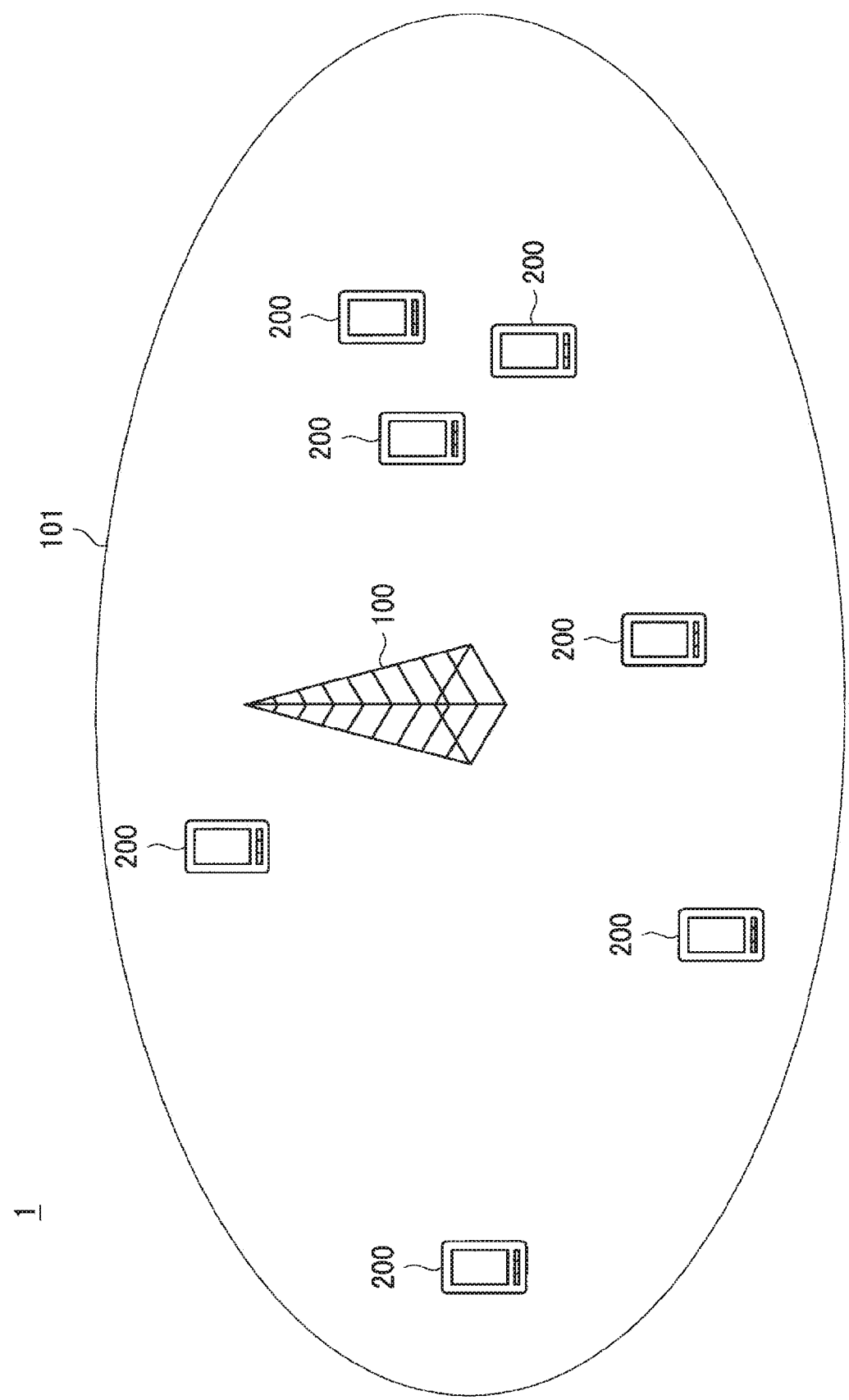
FIG. 7 is an explanatory diagram illustrating an example of a schematic configuration of a system according to an embodiment.

Next, a schematic configuration of a communication system 1 according to an embodiment of the present disclosure will be described with reference to FIG. 7. FIG. 7 is a diagram for describing an example of the schematic configuration of the communication system 1 according to an embodiment of the present disclosure. Referring to FIG. 7, the system 1 includes a base station 100 and terminal apparatuses 200. The system 1 is a system which complies with, for example, LTE, LTE-Advanced, or similar communication standards.

(1) Base Station 100

The base station 100 performs wireless communication with the terminal apparatuses 200. For example, the base station 100 performs wireless communication with the terminal apparatuses 200 located in a cell 101 of the base station 100.

Particularly, in an embodiment of the present disclosure, the base station 100 performs beamforming. For example, the beamforming is beamforming of large-scale MIMO. The beamforming may also be referred to as beamforming of massive MIMO, beamforming of free dimension (FD)-MIMO or three-dimensional beamforming. Specifically, for example, the base station 100 includes a directional antenna usable for large-scale MIMO and performs beamforming of large-scale MIMO by multiplying a transmission signal by a weight set for the directional antenna.

(2) Terminal Apparatus 200

The terminal apparatus 200 performs wireless communication with the base station 100. For example, the terminal apparatus 200 performs wireless communication with the base station 100 when located in the cell 101 of the base station 100.

3. CONFIGURATION OF EACH APPARATUS

Figure 8:
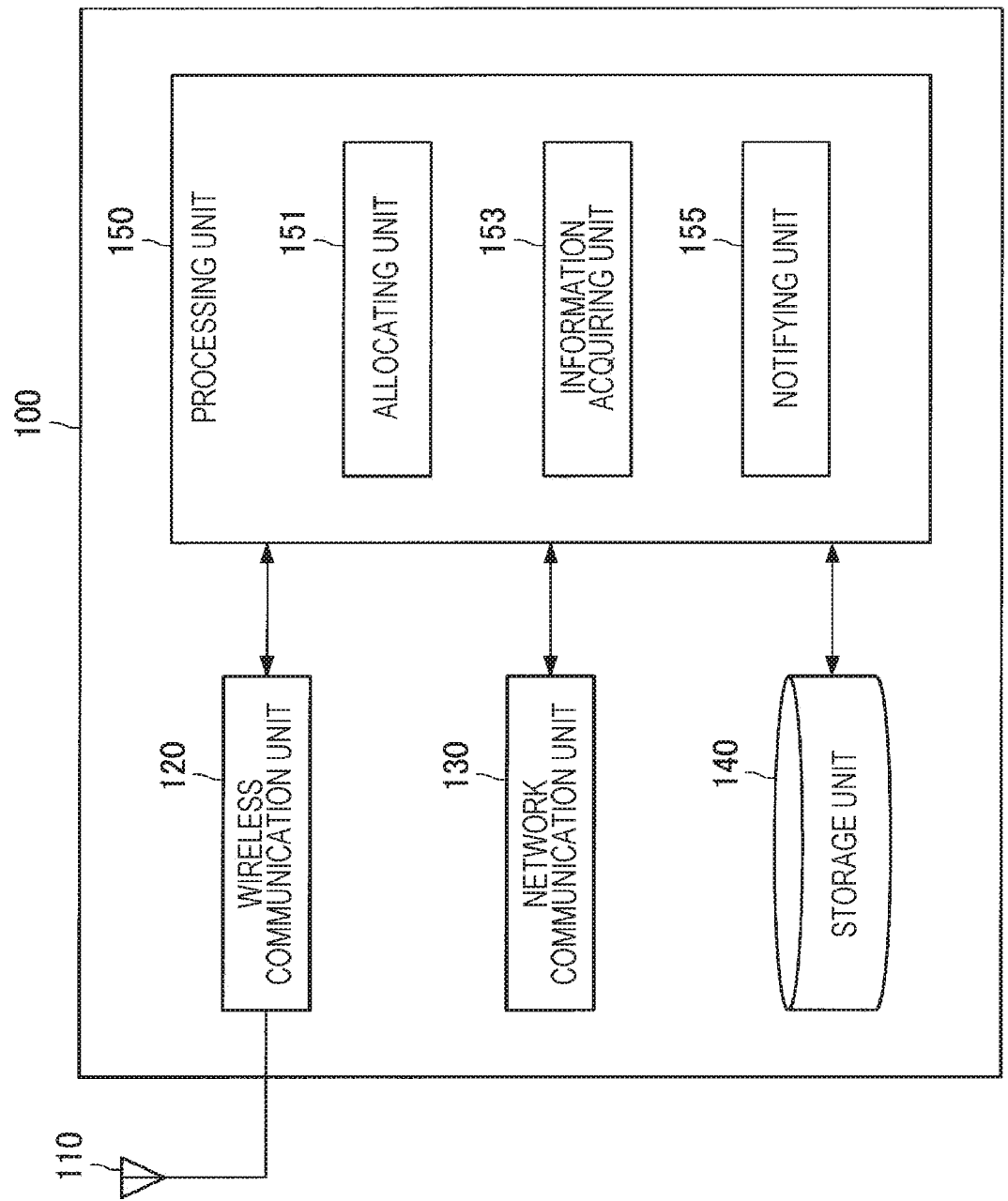
FIG. 8 is a block diagram showing an example of a configuration of a base station according to the embodiment.
Figure 9:
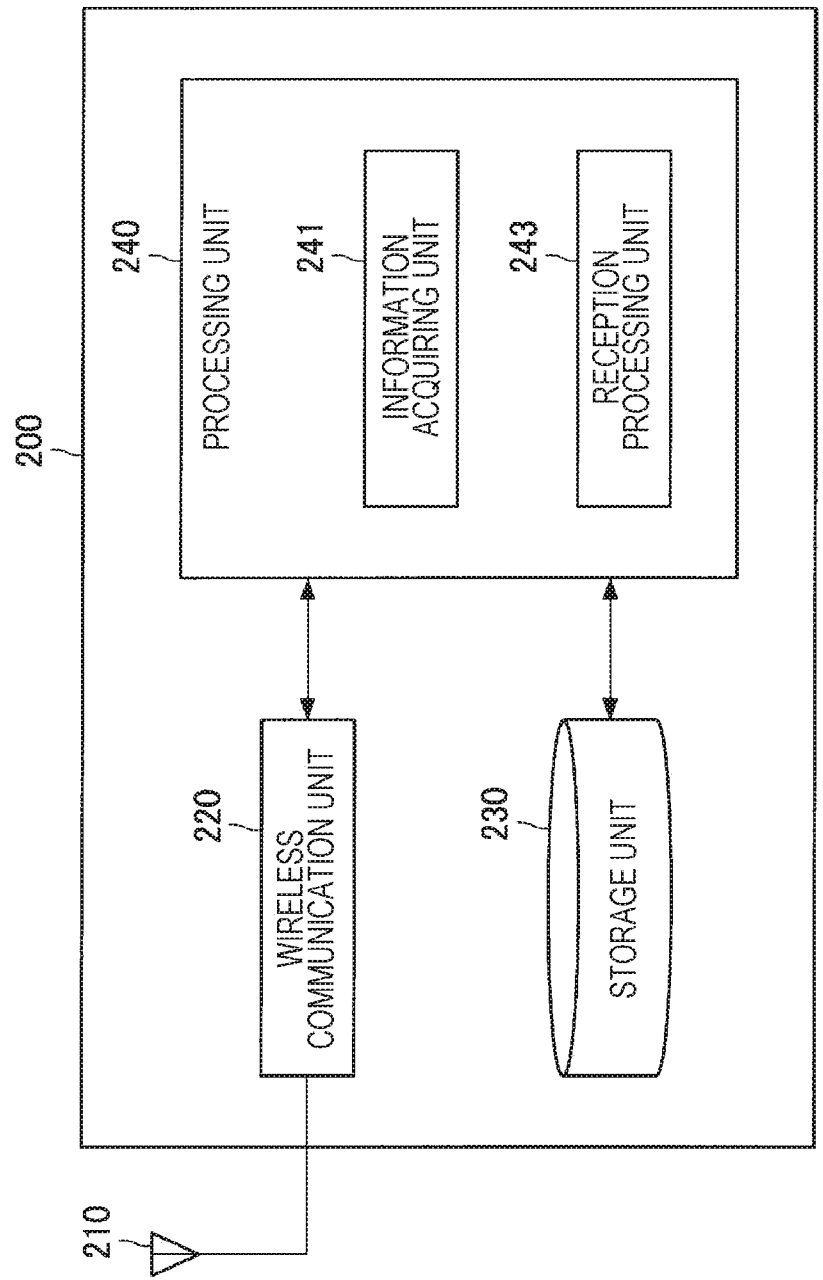
FIG. 9 is a block diagram showing an example of a configuration of a terminal apparatus according to the embodiment.

Next, examples of configurations of the base station 100 and the terminal apparatus 200 will be described with reference to FIGS. 8 and 9.

3.1. Configuration of Base Station

First of all, an example of the configuration of the base station 100 according to an embodiment of the present disclosure will be described with reference to FIG. 8. FIG. 8 is a block diagram showing an example of the configuration of the base station 100 according to the embodiment of the present disclosure. Referring to FIG. 8, the base station 100 includes an antenna unit 110, a wireless communication unit 120, a network communication unit 130, a storage unit 140, and a processing unit 150.

(1) Antenna Unit 110

The antenna unit 110 radiates a signal output by the wireless communication unit 120, in the form of radio waves, into space. The antenna unit 110 also converts radio waves in space into a signal, and outputs the signal to the wireless communication unit 120.

For example, the antenna unit 110 includes a directional antenna. For example, the directional antenna is a directional antenna which can be used in large-scale MIMO.

(2) Wireless Communication Unit 120

The wireless communication unit 120 transmits and receives signals. For example, the wireless communication unit 120 transmits a downlink signal to the terminal apparatus 200 and receives an uplink signal from the terminal apparatus 200.

(3) Network Communication Unit 130

The network communication unit 130 transmits and receives information. For example, the network communication unit 130 transmits information to other nodes and receives information from other nodes. For example, the other nodes include other base stations and a core network node.

(4) Storage Unit 140

The storage unit 140 stores programs and data for operation of the base station 100.

(5) Processing Unit 150

The processing unit 150 provides various functions of the base station 100. The processing unit 150 includes an allocating unit 151, an information acquiring unit 153, and a notifying unit 155. Note that the processing unit 150 may further include other components in addition to such components. That is, the processing unit 150 may perform operations other than operations of such components.

Specific operations of the allocating unit 151, the information acquiring unit 153, and the notifying unit 155 will be described later in detail.

3.2. Configuration of Terminal Apparatus

Next, an example of the configuration of the terminal apparatus 200 according to an embodiment of the present disclosure will be described with reference to FIG. 9. FIG. 9 is a block diagram for showing an example of the configuration of the terminal apparatus 200 according to the embodiment of the present disclosure. Referring to FIG. 9, the terminal apparatus 200 includes an antenna unit 210, a wireless communication unit 220, a storage unit 230 and a processing unit 240.

(1) Antenna Unit 210

The antenna unit 210 radiates a signal output by the wireless communication unit 220, in the form of radio waves, into space. The antenna unit 210 also converts radio waves in space into a signal, and outputs the signal to the wireless communication unit 220.

(2) Wireless Communication Unit 220

The wireless communication unit 220 transmits and receives signals. For example, the wireless communication unit 220 receives a downlink signal from the base station 100 and transmits an uplink signal to the base station 100.

(3) Storage Unit 230

The storage unit 230 stores a program and data for operation of the terminal apparatus 200.

(4) Processing Unit 240

The processing unit 240 provides various functions of the terminal apparatus 200. The processing unit 240 includes an information acquiring unit 241 and the reception processing unit 243. Note that the processing unit 240 may further include other components in addition to such components. That is, the processing unit 240 may also perform operations other than operations of such components.

Specific operations of the information acquiring unit 241 and the reception processing unit 243 will be described below in detail.

4. TECHNICAL FEATURES

Next, technical features according to an embodiment of the present disclosure will be described with reference to FIGS. 10 to 24.

(1) Allocation of Antenna Port to Directional Beam

In the embodiment of the present disclosure, the antenna port is allocated (assigned) to each of the plurality of predefined directional beams (for transmission).

For transmission by the directional beams included in the plurality of directional beams, the antenna port allocated to the directional beam is used.

(a) Allocation of Same Antenna Port

For example, the plurality of directional beams include two or more directional beams allocated to the same antenna port. In other words, the same antenna port is allocated to two or more directional beams among the plurality of directional beams.

For example, the two or more directional beams are directional beams that do not interfere with each other. Specifically, for example, the two or more directional beams are directional beams whose radiation directions are more or less different (for example, directional beams whose radiation direction differs by a predetermined degree or more).

Accordingly, for example, it is possible to reduce the number of antenna ports. As a result, the resources necessary for transmitting the reference signal can be suppressed. In other words, the overhead associated with the reference signal can be suppressed.

Here, the "directional beams that do not interfere with each other" may be "directional beams assumed not to interfere with each other" or "directional beams that actually do not interfere with each other" (as determined by measurement or the like).

(b) Allocation of Different Antenna Ports

For example, the plurality of directional beams include a set of two or more directional beams to which different antenna ports are allocated. In other words, different antenna ports are allocated to two or more directional beams among the plurality of directional beams.

For example, the set of two or more directional beams is a set of directional beams that interfere with each other. Specifically, for example, the set of two or more directional beams is a set of directional beams in which the radiation directions are similar (for example, directional beams whose radiation direction does not differ by a predetermined degree or more).

Accordingly, for example, it is possible to suppress/remove interference between directional beams.

Here, the "directional beams that interfere with each other" may be "directional beams assumed to interfere with each other" or "directional beams that actually interfere with each other" (as determined by measurement or the like).

(c) Specific Example

Figure 10:
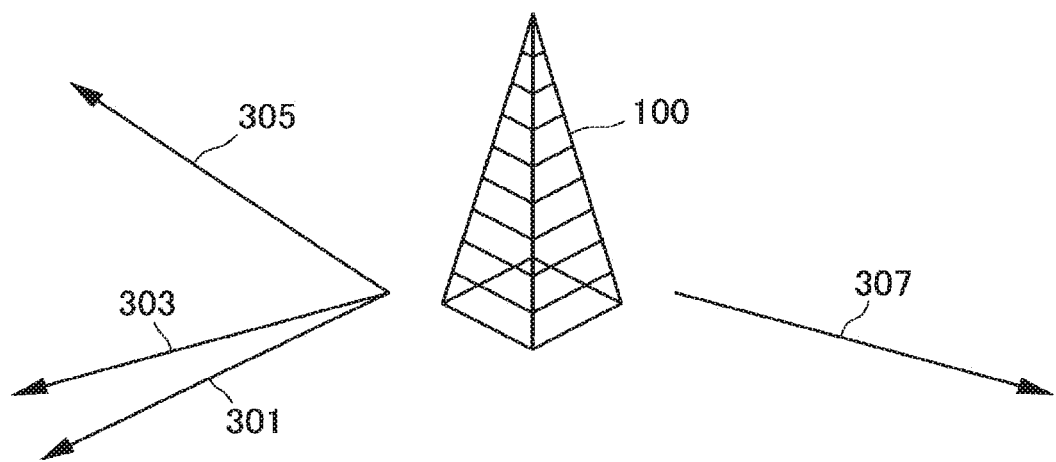
FIG. 10 is an explanatory diagram for describing an example of directional beams formed by a base station.

Specific examples of directional beam and antenna ports will be described with reference to FIGS. 10 and 11. FIG. 10 is an explanatory diagram for describing an example of directional beams formed by a base station 100, and FIG. 11 is an explanatory diagram for describing an example of antenna ports allocated to directional beams.

Referring to FIG. 10, in this example, the base station 100 forms directional beams 301, 303, 305, and 307. The radiation direction of the directional beam 301 and the radiation direction of the directional beam 303 are close to each other, but the radiation direction of the directional beam 305 and the radiation direction of the directional beam 307 are greatly different. In other words, interference may occur between the directional beam 301 and the directional beam 303, but a possibility of interference occurring between the directional beam 301 (or the directional beam 303) and either of the directional beam 305 and the directional beam 307 is considerably low. Further, the radiation direction of the directional beam 305 and the radiation direction of the directional beam 307 are greatly different from each other. In other words, a possibility of interference occurring between the directional beam 305 and the directional beam 307 is very low.

If these points are taken into consideration, for example, an antenna port A is allocated to a beam 0 (the directional beam 301), a beam 2 (the directional beam 305), and a beam 3 (the directional beam 307) as illustrated in FIG. 11. In other words, the same antenna port is allocated to the directional beams that do not interfere with each other. On the other hand, an antenna port B is allocated to the beam 1 (the directional beam 303). In other words, different antenna ports are allocated to a set of directional beams that interfere with each other (the directional beam 301 and the directional beam 303).

(d) Transmission by Each Beam in Resources for Transmitting Reference Signal

An example of transmission by each beam in resources for transmitting a reference signal will be described with reference to FIG. 12. FIG. 12 is an explanatory diagram for describing an example of transmission by each beam in resources for transmitting the reference signal. Referring to FIG. 12, DMRS resources 51 for the antenna port A (that is, resources for transmitting the DMRS using the antenna port A) and DMRS resources 53 for the antenna port B (that is, resources for transmitting the DMRS using the antenna port B) are illustrated. The DMRS resources 51 and the DMRS resources 53 are orthogonal to each other (in at least one of the time/frequency resources and the code sequence).

In this example, the base station 100 transmits the DMRS by the beam 0 (the directional beam 301), the beam 2 (the directional beam 305), and the beam 3 (the directional beam 397) in the DMRS resources 51 using the antenna port A. On the other hand, the base station 100 transmits the DMRS by the beam 1 (the directional beam 303) in the DMRS resources 53 using the antenna port B.

In addition, interference may occur between the beam 0 (the directional beam 301) and the beam 1 (the directional beam 303). For this reason, in order to prevent interference with the DMRS transmitted by the beam 1 (the directional beam 303), the base station 100 does not transmit any signal by the beam 0 (the directional beam 301) in the DMRS resources 53. In other words, the DMRS resources 53 become blank for the beam 0. Further, in order to prevent interference with the DMRS transmitted by the beam 0 (the directional beam 301), the base station 100 does not transmit any signal by the beam 1 (the directional beam 303) in the DMRS resources 51. In other words, the DMRS resources 51 become blank for the beam 1.

Note that a possibility of interference occurring between the beam 1 (the directional beam 303) and either of the beam 2 (the directional beam 305) and the beam 3 (the directional beam 307) is considerably low. Therefore, the base station 100 can transmit the data signal by each of the beam 2 (the directional beam 305) and the beam 3 (the directional beam 307) in the DMRS resources 53 using the antenna port A. Accordingly, for example, the overhead differs according to each beam, and the overhead associated with the transmission of the reference signal can be further suppressed.

(e) Allocating Entity

For example, the base station 100 (the allocating unit 151) allocates an antenna port to each of the plurality of directional beams.

Alternatively, an operator of the base station 100 may allocate an antenna port to each of the plurality of directional beams.

(2) Notification of Antenna-Related Information

In the embodiment of the present disclosure, the base station 100 (the information acquiring unit 153) acquires the antenna-related information related to the antenna port allocated to the directional beam for transmission by the directional beam. The base station 100 (the notifying unit 155) notifies the terminal apparatus 200 of the antenna-related information.

On the other hand, the terminal apparatus 200 (the information acquiring unit 241) acquires the antenna-related information. Then, the terminal apparatus 200 (the reception processing unit 243) performs the reception process on the basis of the antenna-related information.

Accordingly, for example, it is possible to actually allocate the antenna port to each directional beam as described above. Therefore, the number of antenna ports can be decreased. As a result, the resources necessary for transmitting the reference signal can be suppressed. In other words, the overhead associated with the reference signal can be suppressed. Further, the interference between directional beams can be suppressed/removed.

(a) Directional Beam

For example, the directional beam is included in the plurality of directional beams which are predefined.

(b) Antenna Port

For example, the antenna port is a virtual antenna corresponding to one or more physical antennas or antenna elements. As an example, the antenna port corresponds to two or more antenna elements included in an array antenna.

(c) Antenna-Related Information (First Example)

As a first example, the directional beam is a directional beam for transmitting a signal to the terminal apparatus 200. In other words, the base station 100 (the notifying unit 155) notifies the terminal apparatus 200 of the antenna-related information related to the antenna port allocated to the directional beam for transmitting the signal to the terminal apparatus 200.

Referring again to FIGS. 10 and 11, as an example, the directional beam for transmitting a signal to the terminal apparatus 200 is the beam 0 (the directional beam 301), and the antenna-related information is information related to the antenna port A allocated to the beam 0.

(c-1) Specific Information

For example, the antenna-related information related to the antenna port includes information indicating the antenna port.

Specifically, for example, the information is a port number of the antenna port. Referring again to FIG. 11, as an example, the antenna-related information is the port number of the antenna port A allocated to the beam 0 (the directional beam 301).

Accordingly, for example, the terminal apparatus 200 can recognize the antenna port used for transmission of a signal destined for the own terminal apparatus. Therefore, the terminal apparatus 200 can specify resources in which the reference signal (for example, the DMRS) is transmitted using the antenna port and demodulate and decode a signal transmitted by the directional beam on the basis of a reception result of the reference signal.

(c-2) Resources for Transmission of Reference Signal

For example, resources for transmitting the reference signal using the antenna port are predefined. Accordingly, for example, the terminal apparatus 200 is able to recognize the resources when the antenna port is known.

Alternatively, instead of predefining the resources, the antenna-related information may include information indicating the resources for transmitting the reference signal using the antenna port. Accordingly, for example, it is possible to flexibly decide the resources for transmitting the reference signal. In this case, the antenna-related information may include the information indicating the antenna port as described above or may not include the information indicating the antenna port.

For example, the resources are a combination of time/frequency resources and a code sequence.

(c-3) Notification Technique

For example, the base station 100 (the notifying unit 155) notifies the terminal apparatus 200 of the antenna-related information through signaling (for example, radio resource control (RRC) signaling) destined for the terminal apparatus 200. In other words, the base station 100 (the notifying unit 155) notifies the terminal apparatus 200 of the antenna-related information through a signaling message (for example, an RRC message) destined for the terminal apparatus 200.

Alternatively, the base station 100 (the notifying unit 155) may notify the terminal apparatus 200 of the antenna-related information through downlink control information (DCI) destined for the terminal apparatus 200. The DCI is information transmitted on a physical downlink control channel (PDCCH).

(c-4) Further Notification of Other Antenna-Related Information

For example, the base station 100 (the information acquiring unit 153) acquires other antenna-related information related to the antenna port allocated to another directional beam for transmission by the other directional beam. Then, the base station 100 (the notifying unit 155) further notifies the terminal apparatus 200 of the other antenna-related information.

For example, the other directional beam is a directional beam that interferes with the directional beam. Referring again to FIGS. 10 and 11, as an example, the directional beam is the beam 0 (the directional beam 301), and the other directional beam is the beam 1 (the directional beam 303). The other antenna-related information is information related to the antenna port B allocated to the beam 1.

For example, the other antenna-related information also includes information similar to the antenna-related information. Specifically, for example, the other antenna-related information includes the information indicating the antenna port allocated to the other directional beam (for example, the port number of the antenna port B or the like).

For example, the base station 100 (the notifying unit 155) notifies the terminal apparatus 200 of the other antenna-related information through signaling destined for the terminal apparatus 200. Alternatively, the base station 100 (the notifying unit 155) notifies the terminal apparatus 200 of the other antenna-related information through the DCI destined for the terminal apparatus 200.

Accordingly, for example, the terminal apparatus 200 can remove a signal transmitted by another directional beam as interference.

(C-5) Operation of Terminal Apparatus

The Reception Process Based on the Antenna-Related Information

As described above, the terminal apparatus 200 (the reception processing unit 243) performs the reception process on the basis of the antenna-related information.

For example, the terminal apparatus 200 specifies an antenna port allocated to a directional beam for transmitting a signal destined for the terminal apparatus 200 from the antenna-related information, and specifies resources for transmitting the reference signal (for example, the DMRS) using the antenna port. Then, the terminal apparatus 200 restores the phase and the amplitude of the data signal destined for the terminal apparatus 200 on the basis of the reception result of the reference signal transmitted in the resources, and demodulates and decodes the data signal.

Reception Process Based on Other Antenna-Related Information

For example, the terminal apparatus 200 (the reception processing unit 243) performs the reception process further on the basis of other antenna-related information.

For example, the terminal apparatus 200 specifies an antenna port allocated to another directional beam that interferes with the directional beam from the other antenna-related information, and specifies resources for transmitting the reference signal (for example, the DMRS) using the antenna port. Then, the terminal apparatus 200 generates the signal transmitted by the other directional beam as an interference signal on the basis of the reception result of the reference signal transmitted in the resources and removes the interference signal from a reception signal. Then, the terminal apparatus 200 demodulates and decodes the data signal destined for the terminal apparatus 200 from the signal after the removal.

(d) Antenna-Related Information (Second Example)

As a second example, the base station 100 (the information acquiring unit 153) may acquire the antenna-related information for each of the plurality of directional beams which are predefined. Then, the base station 100 (the notifying unit 155) may notify the terminal apparatus 200 of the antenna-related information for each of the plurality of directional beams.

Referring again to FIGS. 10 and 11, as an example, the plurality of directional beams may include the beam 0 (the directional beam 301), the beam 1 (the directional beam 303), the beam 2 (the directional beam 305), and the beam 3 (the directional beam 307). The base station 100 (the notifying unit 155) may notify the terminal apparatus 200 of the antenna-related information for each of the beam 0, the beam 1, the beam 2, the beam 3, and the like. Further, the "antenna-related information for the beam 0" means "antenna-related information related to the antenna port allocated to the beam 0."

(d-1) Specific Information

The antenna-related information related to the directional beam may include the information indicating the antenna port allocated to the directional beam (for example, the port number of the antenna port). Further, the antenna-related information related to the directional beam may further include the information indicating the directional beam (for example, a precoding matrix indicator (PMI) corresponding to the directional beam or the like). Specifically, the antenna-related information may include a set of the information indicating the directional beam and the information indicating the antenna port.

Referring again to FIG. 11, as an example, the antenna-related information for the beam 0 may include a set of the PMI corresponding to the beam 0 and the port number of the antenna port A allocated to the beam 0.

(d-2) Resources for Transmission of Reference Signal

The resources for transmitting the reference signal using the antenna port may be predefined.

Alternatively, resources for transmitting the reference signal using the antenna port may not be predefined. In this case, the antenna-related information related to the antenna port may include the information indicating the resources for transmitting the reference signal using the antenna port. In this case, the antenna-related information may include the information indicating the antenna port as described above or may not include information indicating the antenna port.

Note that the resources may be a combination of time/frequency resources and a code sequence.

(d-3) Notification Technique

The base station 100 (the notifying unit 155) may notify the terminal apparatus 200 of the antenna-related information related to each of the plurality of directional beams through signaling (for example, the RRC signaling) destined for the terminal apparatus 200. In other words, the base station 100 (the notifying unit 155) notifies the terminal apparatus 200 of the antenna-related information related to each of the plurality of directional beams through a signaling message (for example, the RRC message) destined for the terminal apparatus 200.

Alternatively, the base station 100 (the notifying unit 155) may notify the terminal apparatus 200 of the antenna-related information through system information (for example, a system information block (SIB)).

(d-4) Specifying of Directional Beam

The base station 100 (the notifying unit 155) may notify the terminal apparatus 200 of beam information indicating a directional beam for transmitting a signal destined for the terminal apparatus 200.

Alternatively, the terminal apparatus 200 may select an appropriate directional beam for transmitting a signal destined for the terminal apparatus 200 on the basis of a result of measurement (for example, measurement based on the reference signal (for example, the CSI-RS)) and report information (report information) indicating the appropriate directional beam to the base station 100. Then, the base station 100 may transmit a signal to the terminal apparatus 200 by the appropriate directional beam. For the selection of the directional beam, the base station 100 may transmit the reference signal by a directional beam, and the terminal apparatus 200 may evaluate the directional beam on the basis of a reception result of the reference signal. Alternatively, the terminal apparatus 200 may virtually evaluate the directional beam on the basis of a reception result of a non-directional reference signal and a set of weight coefficients corresponding to the directional beam.

Accordingly, for example, the terminal apparatus 200 can specify the directional beam for transmitting the signal destined for the terminal apparatus 200.

Note that the base station 100 (the notifying unit 155) may also notify the terminal apparatus 200 of other beam information indicating another directional beam. The other directional beam may be a directional beam that interferes with the directional beam for transmitting the signal destined for the terminal apparatus 200.

(d-5) Operation of Terminal Apparatus

As described above, the terminal apparatus 200 (the reception processing unit 243) may perform the reception process on the basis of the antenna-related information.

The terminal apparatus 200 may specify the antenna port allocated to the directional beam for transmitting the signal destined for the terminal apparatus 200 on the basis of the beam information and the antenna-related information. Further, the terminal apparatus 200 may specify the resources for transmitting the reference signal (for example, the DMRS) using the antenna port. The terminal apparatus 200 may restore the phase and the amplitude of the data signal destined for the terminal apparatus 200 on the basis of the reception result of the reference signal transmitted in the resources, and demodulate and decode the data signal Further, the terminal apparatus 200 may specify the antenna port allocated to another directional beam that interferes with the directional beam from other beam information and the antenna-related information. Further, the terminal apparatus 200 may specify the resources for transmitting the reference signal (for example, the DMRS) using the antenna port. Then, the terminal apparatus 200 may generate the signal transmitted by the other directional beam as an interference signal on the basis of the reception result of the reference signal transmitted in the resources and remove the interference signal from the reception signal. Then, the terminal apparatus 200 may demodulate and decode the data signal destined for the terminal apparatus 200 from the signal after the removal.

(3) Dynamic/Quasi-Static Antenna Port Allocation

For example, the base station 100 (the allocating unit 151) dynamically or quasi-statically allocates an antenna port to each of the plurality of directional beams which are predefined. In other words, the base station 100 (the allocating unit 151) does not statically (that is, fixedly) allocate an antenna port to each of the plurality of directional beams but changes an antenna port allocated to each of the plurality of directional beams.

For example, the base station 100 (the allocating unit 151) allocates an antenna port to each of the plurality of directional beams on the basis of interference information reported from the terminal apparatus 200. For example, the terminal apparatus 200 measures interference on the basis of the CSI-RS and reports a result of the measurement to the base station 100 as the interference information. As an example, the terminal apparatus 200 measures reception power of each directional beam on the basis of the CSI-RS and reports information indicating one or more directional beams (for example, one or more interference beams) with high reception power to the base station 100 as the interference information.

For example, the base station 100 allocates an antenna port to each of the plurality of directional beams so that different antenna ports are allocated to two directional beams that interfere with each other.

More specifically, for example, the base station 100 changes the directional beam in accordance with a change in the position of the terminal apparatus 200 located in the cell 101. Further, for example, the base station 100 changes the number of directional beams in accordance with a change in the number of terminal apparatuses 200 located in the cell 101. Therefore, for example, the base station 100 changes the directional beam or the number of directional beams, and as a result, more than a certain amount of interference may occur between the two directional beams to which the same antenna port is allocated. In this case, the base station 100 allocates different antenna ports to the two directional beams. In this case, the number of antenna ports may be increased.

For example, even when the base station 100 changes the directional beam or the number of directional beams, and another antenna port is accordingly allocated to one or more directional beams to which a certain antenna port is allocated, interference does not occur. Then, the base station 100 allocates another antenna port to the one or more directional beams. In this case, the certain antenna port becomes unnecessary, and the number of antenna ports can be decreased accordingly.

Accordingly, for example, the antenna port is allocated in view of an actual interference situation. As a result, interference between directional beams can be suppressed. Further, the number of antenna ports can be suppressed and the overhead associated with the reference signal can be suppressed.

(4) Various Examples of Antenna Port Allocation

In the embodiment of the present disclosure, there may be various antenna port allocations. Next, first to fourth techniques of allocating the antenna port will be exemplarily described.

(a) First Technique

For example, the plurality of predefined directional beams include a first directional beam, a second directional beam, and a third directional beam. The first directional beam is adjacent to the second directional beam and the third directional beam. The second directional beam and the third directional beam are not adjacent to each other. Here, "the first directional beam is adjacent to the second directional beam" means that the radiation direction of the first directional beam is adjacent to the radiation direction of the second directional beam in a set of discrete radiation directions.

Particularly, in a first technique, a first antenna port is allocated to the first directional beam, and a second antenna port different from the first antenna port is allocated to the second directional beam and the third directional beam. A specific example will be described below with reference to FIGS. 13 to 17.

(a-1) Example of Directional Beam

Figure 13:
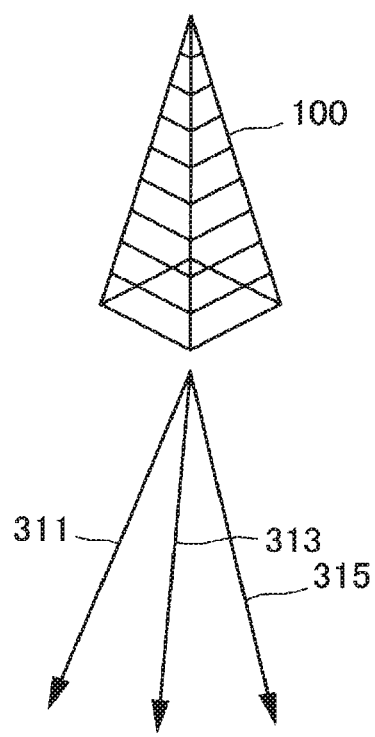
FIG. 13 is an explanatory diagram for describing an example of directional beams formed by a base station.

FIG. 13 is an explanatory diagram for describing an example of directional beams formed by the base station 100. Referring to FIG. 13, in this example, the base station 100 forms directional beams 311, 313, and 315. The directional beam 313 is adjacent to the directional beam 311 and the directional beam 315, and the directional beam 311 and the directional beam 315 are not adjacent to each other. For example, the directional beam 313 is the first directional beam, the directional beam 313 is the second directional beam, and the directional beam 315 is the third directional beam.

(a-2) Other Technique (Technique of Preparing Different Antenna Ports for Each Directional Beam)

FIG. 14 is an explanatory diagram for describing an example of an antenna port allocated to each directional beam according to another technique (a technique of preparing a different antenna port for each directional beam). Referring to FIG. 14, in this technique, the antenna port A is allocated to the beam 0 (the directional beam 311), the antenna port B is allocated to the beam 1 (the directional beam 313), and the antenna port C is allocated to the beam 2 (the directional beam 315).

FIG. 15 is an explanatory diagram for describing an example of transmission by respective beams in another technique. Referring to FIG. 15, DMRS resources 51 for the antenna port A, DMRS resources 53 for the antenna port B, and DMRS resources 55 for the antenna port C are illustrated. The DMRS resources 51, the DMRS resources 53, and the DMRS resources 55 are orthogonal to one another. In this example, the base station 100 transmits the DMRS by the beam 0 (the directional beam 311) in the DMRS resources 51 using the antenna port A. Further, the base station 100 transmits the DMRS by the beam 1 (the directional beam 313) in the DMRS resources 53 using the antenna port B. Further, the base station 100 transmits the DMRS by the beam 2 (the directional beam 315) in the DMRS resources 55 using the antenna port C. As a result, it is necessary to prepare many DMRS resources for transmission of the DMRS, and the overhead is increased.

(a-3) First Technique of Allocating Antenna Port

Figure 16:
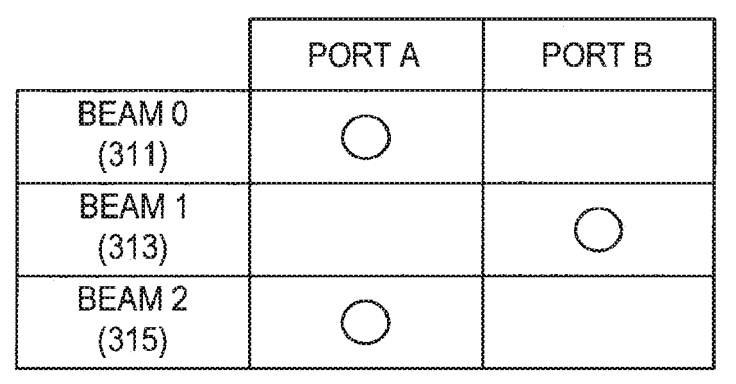

FIG. 16 is an explanatory diagram for describing an example of antenna ports allocated to respective directional beams by the first technique. Referring to FIG. 16, in this technique, the antenna port A is allocated to the beam 0 (the directional beam 311) and the beam 2 (the directional beam 315), and the antenna port B is allocated to the beam 1 (the directional beam 313).

Figure 17:
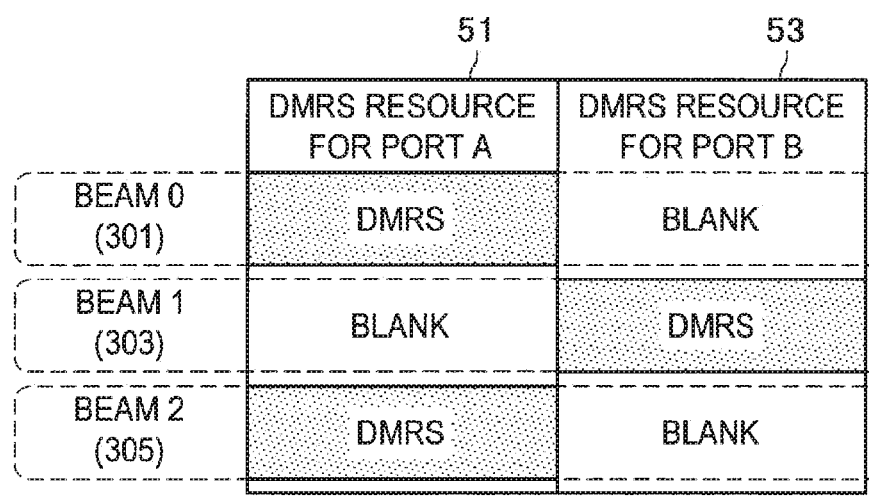
FIG. 17 is an explanatory diagram for describing an example of transmission by respective beams in a first technique.

FIG. 17 is an explanatory diagram for describing an example of transmission by respective beams in the first technique. Referring to FIG. 15, DMRS resources 51 for the antenna port A and DMRS resources 53 for the antenna port B are illustrated. The DMRS resources 51 and the DMRS resources 53 are orthogonal to each other. In this example, the base station 100 transmits the DMRS by the beam 0 (the directional beam 311) and the beam 2 (the directional beam 313) in the DMRS resources 51 using the antenna port A. Further, the base station 100 transmits the DMRS by the beam 1 (the directional beam 313) in the DMRS resources 53 using the antenna port B. As a result, a smaller number of DMRS resources are prepared for transmission of the reference signal, and the overhead is decreased. In this example, for example, the antenna port B is the first antenna port, and the antenna port A is the second antenna port.

As described above, according to the first technique, the antenna port is shared by the directional beams, and thus the number of antenna ports can be reduced.

(a-4) Further Specific Features

As further specific features, one of the two directional beams adjacent to each other among the plurality of directional beams may be a directional beam to which the first antenna port is allocated, and the other of the two arbitrary directional beams may be a directional beam to which the second antenna port is allocated. As described above, only the first antenna port and the second antenna port may be prepared, and the antenna ports may be alternately allocated. Accordingly, for example, the number of antenna ports is two.

(b) Second Technique

In a second technique, further features are added in addition to the first technique.

For example, the first directional beam is adjacent to the second directional beam and the third directional beam in one of the horizontal direction and the vertical direction. Further, the plurality of directional beams include a fourth directional beam and a fifth directional beam to which the first directional beam is adjacent in the other of the horizontal direction and the vertical direction. The fourth directional beam and the fifth directional beam are not adjacent to each other.

Particularly, in the second technique, the fourth directional beam and the fifth directional beam are directional beams to which the second antenna port is allocated.

Further, for example, one of two arbitrary directional beams which are adjacent to each other among the plurality of directional beams may be a directional beam to which the first antenna port is allocated, and the other of the two arbitrary directional beams may be a directional beam to which the second antenna port is allocated. A specific example will be described below with reference to FIG. 18.

Figure 18:
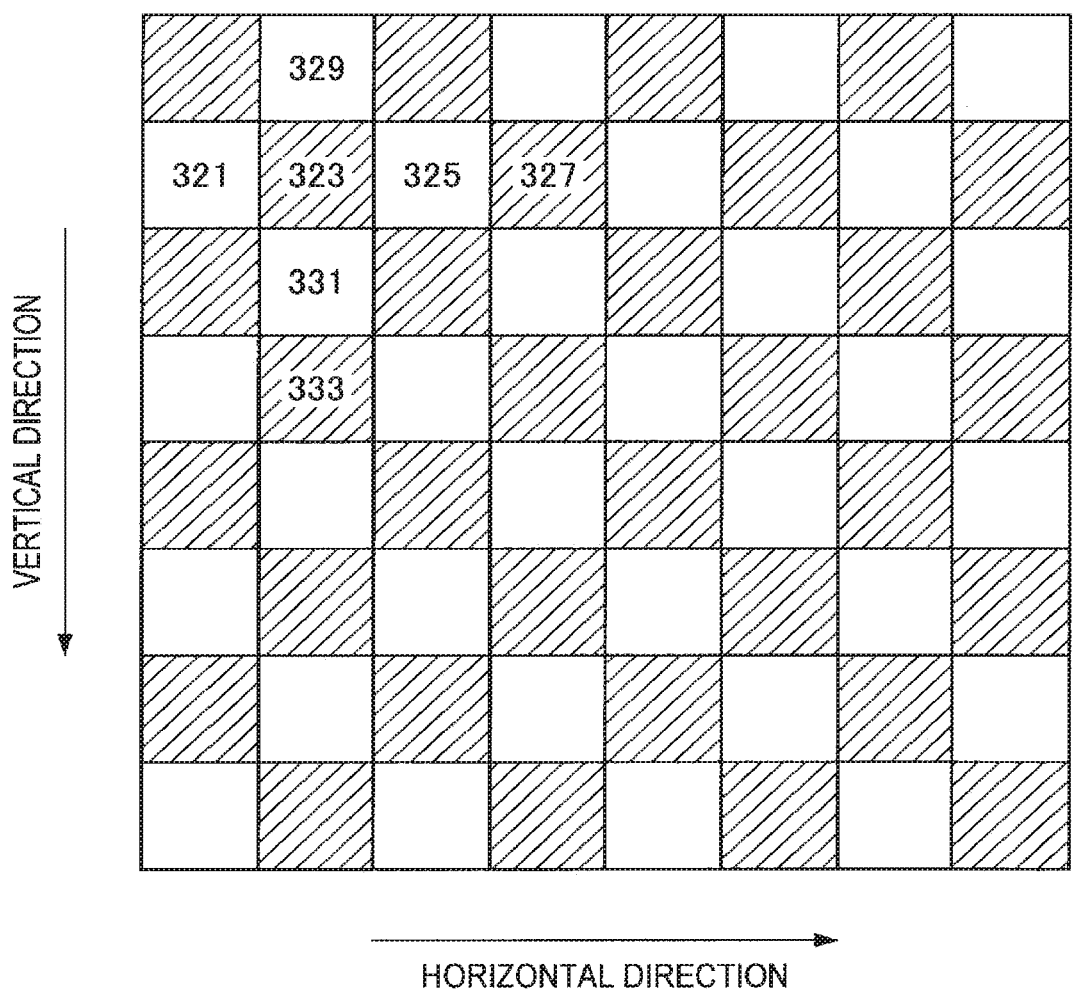
FIG. 18 is an explanatory diagram for describing an example of antenna ports allocated to respective directional beams by a second technique.

FIG. 18 is an explanatory diagram for describing an example of antenna ports allocated to respective directional beams in accordance with the second technique. Referring to FIG. 18, 64 (8×8) directional beams having directivity in the horizontal direction and the vertical direction are illustrated. For example, directional beams 321, 323, 325, and 327 are directional beams arranged in the horizontal direction, and directional beams 329, 323, 331, and 333 are directional beams arranged in the vertical direction. The antenna port A is allocated to the directional beams 321, 325, 329, and 331, and the antenna port B is allocated to the directional beams 323, 327, and 333. In this example, for example, the directional beam 323 is a first directional beam, and the directional beams 321, 325, 329, and 331 are the second directional beam, the third directional beam, the fourth directional beam, and the fifth directional beam. Further, the antenna port B is the first antenna port, and the antenna port A is the second antenna port.

As described above, according to the second technique, the antenna port is shared by the directional beams, and the number of antenna ports can be reduced. For example, the number of antenna ports can be two.

Practically, three or more antenna ports can be prepared in view of reflection of directional beam or the like. Further, in an environment with less reflection of directional beams, only two antenna ports may be prepared.

(c) Third Technique

For example, the plurality of directional beams include a first number of consecutive directional beams. Particularly, in a third technique, the first number of different antenna ports are allocated to the first number of consecutive directional beams. For example, the first number of consecutive directional beams are consecutive in one of the horizontal direction and the vertical direction. Here, "consecutive directional beams" means directional beams having consecutive radiation directions in a set of discrete radiation directions.

For example, the same antenna port is allocated to the directional beam which is away by the first number among the consecutive directional beams.

(c-1) Specific Example

Figure 19:
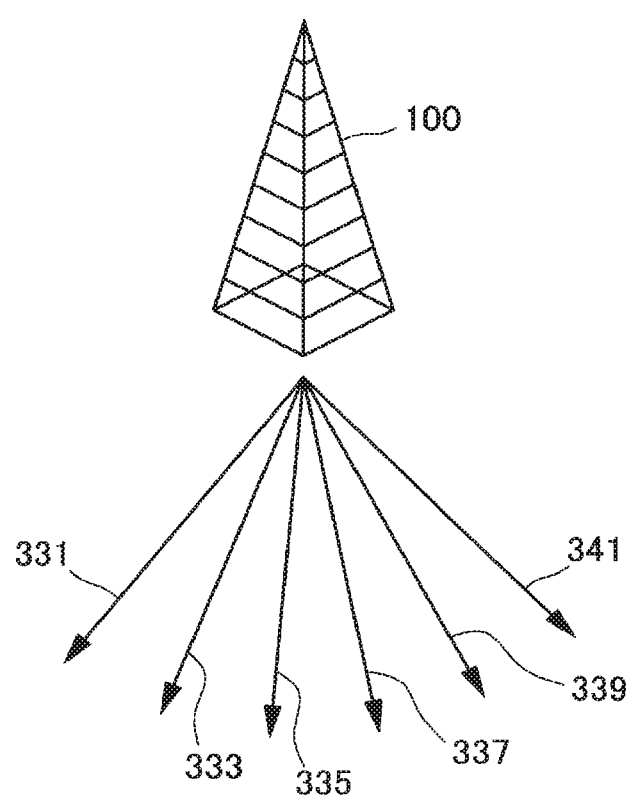
FIG. 19 is an explanatory diagram for describing an example of directional beams formed by a base station.

A specific example of the directional beam and the antenna port will be described with reference to FIGS. 19 and 20. FIG. 19 is an explanatory diagram for describing an example of directional beams formed by the base station 100, and FIG. 20 is an explanatory diagram for describing an example of antenna ports allocated to the respective directional beams in accordance with the third technique. Referring to FIG. 19, in this example, the base station 100 forms six consecutive directional beams 331, 333, 335, 337, 339, and 341 in the horizontal direction. Further, referring to FIG. 20, in this example, the antenna port A is allocated to a beam 0 (the directional beam 331) and a beam 3 (the directional beam 337). Further, the antenna port B is allocated to a beam 1 (the directional beam 333) and a beam 4 (the directional beam 339). Further, the antenna port C is allocated to a beam 2 (the directional beam 335) and a beam 5 (the directional beam 341). As described above, the same antenna port is allocated to the directional beam that is 3 away among the consecutive directional beams. Further, three different antenna ports are allocated to three consecutive directional beams. For example, three different antenna ports are allocated to the beam 0 (the directional beam 331), the beam 1 (the directional beam 333), and the beam 2 (the directional beam 335). Further, three different antenna ports are allocated to the beam 1 (the directional beam 333), the beam 2 (the directional beam 335), and the beam 3 (the directional beam 337). Further, three different antenna ports are allocated to the beam 2 (the directional beam 335), the beam 3 (the directional beam 337), and the beam 4 (the directional beam 339). Further, three different antenna ports are allocated to the beam 3 (the directional beam 337), the beam 4 (the directional beam 339), and the beam 5 (the directional beam 341).

As described above, according to the third technique, different antenna ports are allocated to a predetermined number (first number) of directional beams whose radiation directions are close to each other, and thus interference is suppressed. Further, since the same antenna port is allocated to the directional beam which is away by the predetermined number, the number of antenna ports can be reduced. As a result, the overhead can be suppressed.

(c-2) Transmission by Respective Beams in Resources for Transmitting Reference Signal An example of transmission by respective beams in resources for transmitting the reference signal will be described with reference to FIG. 21. FIG. 21 is an explanatory diagram for describing an example of transmission by respective beams in the third technique. Referring to FIG. 21, DMRS resources 51 for the antenna port A, DMRS resources 53 for the antenna port B, and DMRS resources 55 for the antenna port C are illustrated. The DMRS resources 51, the DMRS resources 53, and the DMRS resources 55 are orthogonal to one another (in at least one of the time/frequency resources and the code sequence).

In this example, the base station 100 transmits the DMRS by the beam 0 (the directional beam 331) and the beam 3 (the directional beam 337) in the DMRS resources 51 using the antenna port A. Further, the base station 100 transmits the DMRS by the beam 1 (the directional beam 333) and the beam 4 (the directional beam 339) in the DMRS resources 53 using the antenna port B. Further, the base station 100 transmits the DMRS by the beam 2 (the directional beam 335) and the beam 5 (the directional beam 341) in the DMRS resources 55 using the antenna port C.

The DMRS resources 51 are blank for the beams 1, 2, 3, and 5, the DMRS resources 53 are blank for the beams 0, 2, 3, and 5, and the DMRS resources 55 are blank for the beams 0, 1, 3, and 4. Accordingly, interference on the DMRS is prevented.

(d) Fourth Technique

In a fourth technique, additional features are added in addition to the third technique.

For example, the plurality of directional beams include a second number of consecutive directional beams different from the first number of consecutive directional beams. Particularly, in the second technique, the second number of different antenna ports are allocated to the second number of consecutive directional beams. For example, the second number of consecutive directional beams are consecutive in one of the horizontal direction and the vertical direction.

(d-1) Specific Example

Figure 22:
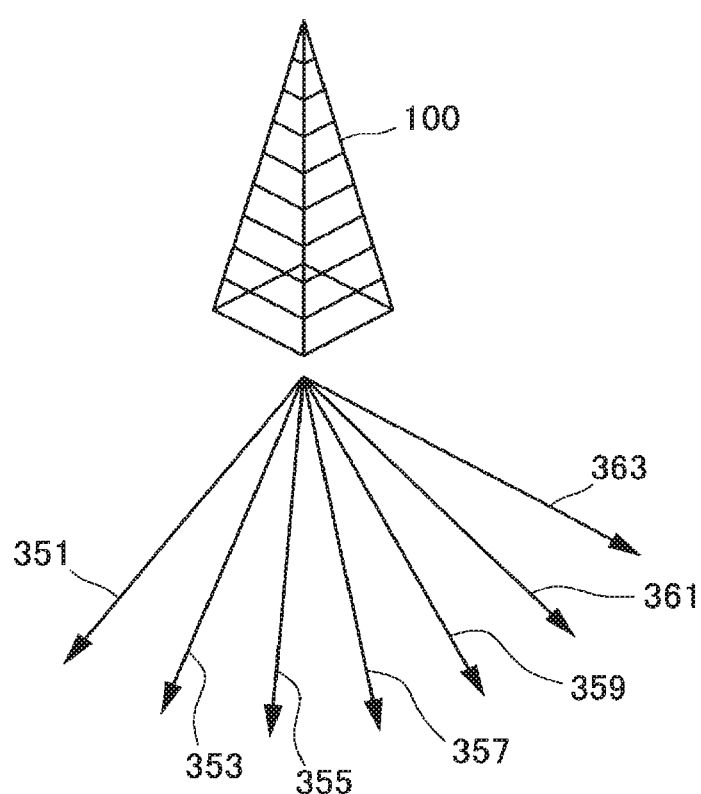
FIG. 22 is an explanatory diagram for describing an example of directional beams formed by a base station.

A specific example of the directional beam and the antenna port will be described with reference to FIGS. 22 and 23. FIG. 22 is an explanatory diagram for describing an example of directional beams formed by the base station 100, and FIG. 23 is an explanatory diagram for describing an example of the antenna ports allocated to the respective directional beams in accordance with the fourth technique. Referring to FIG. 22, in this example, the base station 100 forms seven consecutive directional beams 351, 353, 355, 357, 359, 361, and 363 in the horizontal direction. Further, referring to FIG. 23, in this example, the antenna port A is allocated to a beam 0 (the directional beam 351) and a beam 3 (the directional beam 357). Further, the antenna port B is allocated to the beam 1 (the directional beam 353) and a beam 4 (the directional beam 359). Further, the antenna port C is allocated to a beam 2 (the directional beam 355) and a beam 5 (the directional beam 361). Further, the antenna port D is allocated to a beam 6 (the directional beam 363). In this example, three different antenna ports are allocated to three arbitrary consecutive directional beams among the beams 0 to 5. On the other hand, since the beam 6 is likely to interfere with the beam 3 (or example, due to interference) as well as the beams 4 and 5, four different antenna ports are allocated to the beams 3 to 6.

As described above, according to the fourth technique, when a possibility of the occurrence of interference is different depending on a direction from the base station 100, it is possible to change the number of antenna ports to be allocated in accordance with the possibility of the occurrence of interference. For example, a small number of antenna ports may be allocated for a direction in which the possibility of the occurrence of interference is low, and more antenna ports may be allocated for a direction in which the possibility of the occurrence of interference is high. Accordingly, for example, the interference can be appropriately suppressed.

(d-2) Transmission by Respective Beams in Resources for Transmitting Reference Signal An example of transmission by respective beams in resources for transmitting a reference signal will be described with reference to FIG. 24. FIG. 24 is an explanatory diagram for describing an example of transmission by respective beams in the fourth technique. Referring to FIG. 24, DMRS resources 51 for the antenna port A, DMRS resources 53 for the antenna port B, DMRS resources 55 for the antenna port C, and DMRS resources 57 for the antenna port D are illustrated. The DMRS resources 51, the DMRS resources 53, the DMRS resources 55, and the DMRS resources 57 are orthogonal to one another (in at least one of the time/frequency resources and the code sequence).

In this example, the base station 100 transmits the DMRS by the beam 0 (the directional beam 351) and the beam 3 (the directional beam 357) in the DMRS resources 51 using the antenna port A. Further, the base station 100 transmits the DMRS by the beam 1 (the directional beam 353) and the beam 4 (the directional beam 359) in the DMRS resources 53 using the antenna port B. Further, the base station 100 transmits the DMRS by the beam 2 (the directional beam 355) and the beam 5 (the directional beam 361) in the DMRS resources 55 using the antenna port C. Further, the base station 100 transmits the DMRS by the beam 6 (the directional beam 363) in the DMRS resources 57 using the antenna port D.

The DMRS resources 51 are blank for the beams 1, 2, 3, 5, and 6, the DMRS resources 53 are blank for beams 0, 2, 3, 5, and 6, the DMRS resources 55 are blank for the beams 0, 1, 3, 4, and 6, and the DMRS resources 57 are blank for the beams 3, 4, and 5. Accordingly, the interference on the DMRS is prevented.

Note that the possibility of interference occurring between the beams 0, 1, and 2 (the directional beams 351, 353, and 355) and the beam 6 (the directional beam 363) is low. Therefore, the base station 100 can transmit the data signal by the beam 0 (the directional beam 351) in the DMRS resources 57 using the antenna port A. Further, the base station 100 can transmit the data signal by the beam 1 (the directional beam 353) in the DMRS resources 57 using the antenna port B. Further, the base station 100 can transmit the data signal by the beam 2 (the directional beam 353) in the DMRS resources 57 using the antenna port C. Accordingly, for example, the overhead differs according to each beam, and the overhead related to transmission of the reference signal is further suppressed.

5. Processing Flow

Next, a processing flow according to the embodiment of the present disclosure will be described with reference to FIGS. 25 to 27.

(1) Transmission/Reception Process

(a) First Example

Figure 25:
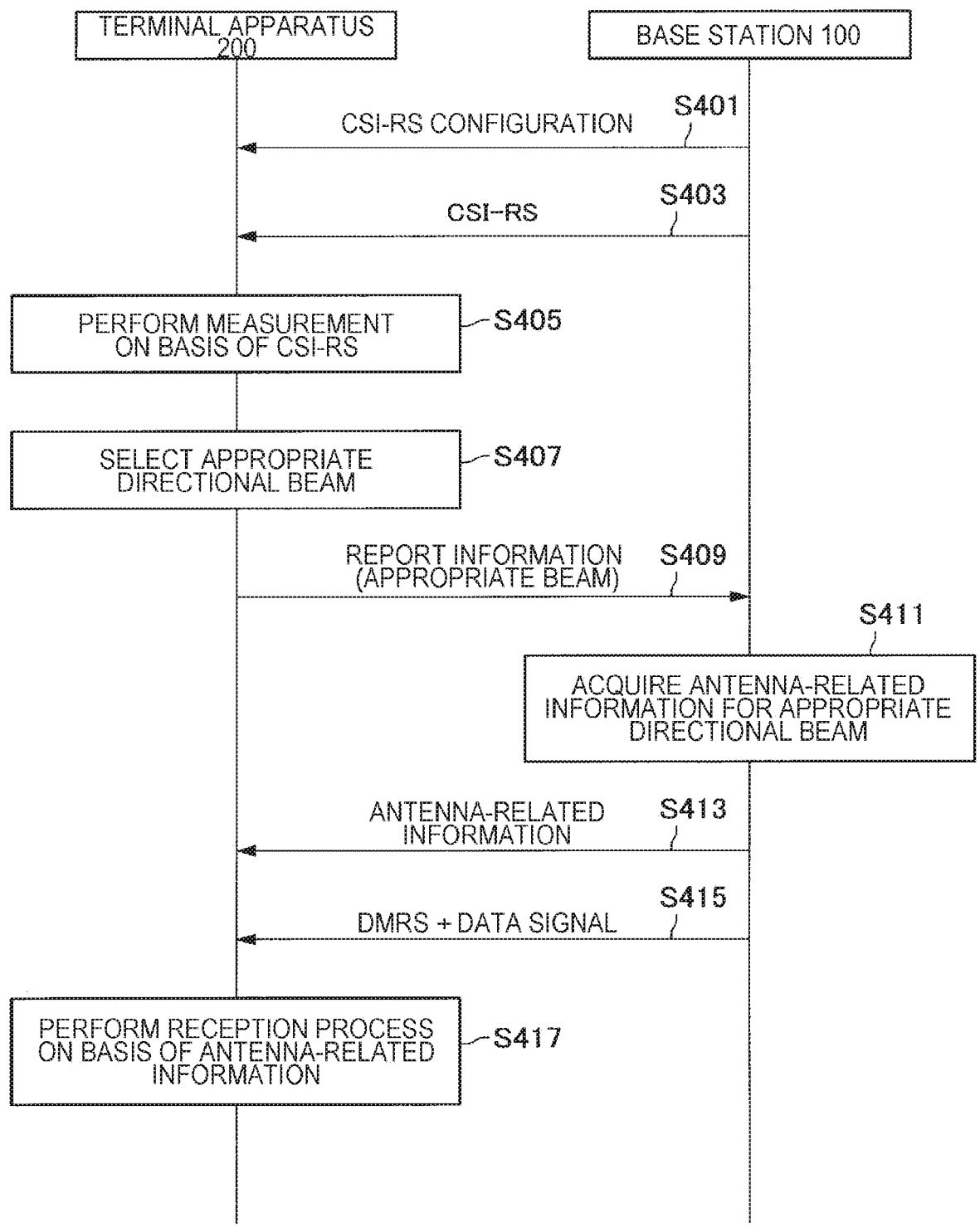
FIG. 25 is a flowchart illustrating a first example of a schematic flow of a transmission/reception process according to the embodiment.

FIG. 25 is a flowchart illustrating a first example of a schematic flow of a transmission/reception process according to the embodiment of the present disclosure.

The base station 100 notifies the terminal apparatus 200 of a CSI-RS configuration (S401). Further, the base station 100 transmits the CSI-RS (S403).

The terminal apparatus 200 performs measurement on the basis of the CSI-RS (S405). Then, the terminal apparatus 200 selects an appropriate directional beam on the basis of a result of the measurement (S407). Then, the terminal apparatus 200 reports information indicating the appropriate beam to the base station 100 as the report information (S409).

The base station 100 decides the appropriate directional beam as the directional beam for transmitting the signal destined for the terminal apparatus 200 and acquires the antenna-related information for the appropriate directional beam (S411). The antenna-related information is information related to the antenna port allocated to the appropriate directional beam for transmission by the appropriate directional beam. For example, the antenna-related information includes information (for example, the port number) indicating the antenna port allocated to the appropriate directional beam.

The base station 100 notifies the terminal apparatus 200 of the antenna-related information (S413). For example, the base station 100 notifies the terminal apparatus 200 of the antenna-related information through signaling (for example, the RRC signaling) destined for the terminal apparatus 200. Alternatively, the base station 100 may notify the terminal apparatus 200 of the antenna-related information through the DCI destined for the terminal apparatus 200.

Further, the base station 100 transmits the DMRS and the data signal destined for the terminal apparatus 200 by the appropriate directional beam (S415).

The terminal apparatus 200 performs the reception process on the basis of the antenna-related information (S417).

Note that the base station 100 may notify the terminal apparatus 200 of another antenna-related information related to the antenna port allocated to another directional beam. The other directional beam may be a directional beam that interferes with the appropriate directional beam. Then, the terminal apparatus 200 may perform the reception process further on the basis of the other antenna-related information.

(b) Second Example

Figure 26:
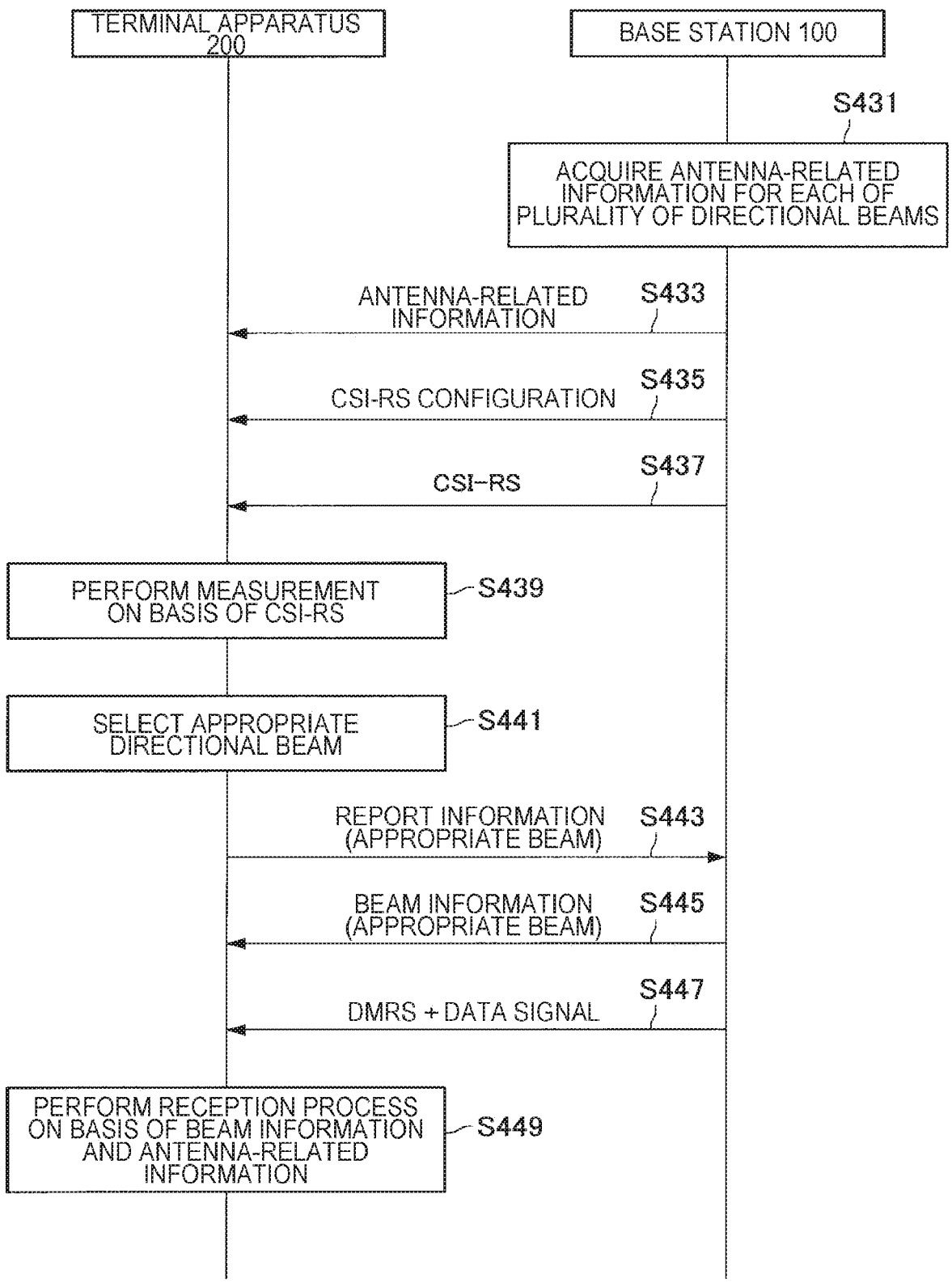
FIG. 26 is a flowchart illustrating a second example of a schematic flow of a transmission/reception process according to the embodiment.

FIG. 26 is a flowchart illustrating a second example of a schematic flow of the transmission/reception process according to the embodiment of the present disclosure.

Here, description of steps S435 to S443 illustrated in FIG. 26 is the same as description of steps S401 to S409 illustrated in FIG. 25. Therefore, description will proceed focusing on steps S431, S433, and S445 to S449.

The base station 100 acquires the antenna-related information for each of the plurality of predefined directional beams (S431). For example, the antenna-related information for the directional beams included in the plurality of directional beams is information related to the antenna port allocated to the directional beam for transmission by the directional antenna. For example, the antenna-related information includes a combination of the information indicating the directional beam (for example, PMI) and the information indicating the antenna port allocated to the directional beam (for example, the port number).

The base station 100 notifies the terminal apparatus 200 of the antenna-related information for the plurality of directional beams (S433). For example, the base station 100 notifies the terminal apparatus 200 of the antenna-related information for the plurality of directional beams through signaling (for example, the RRC signaling) destined for the terminal apparatus 200. Alternatively, the base station 100 may notify the terminal apparatus 200 of the antenna-related information through the system information (for example, an SIB).

The base station 100 decides the appropriate directional beam (S441) selected by the terminal apparatus 200 as a directional beam for transmitting the signal destined for the terminal apparatus 200 and notifies the terminal apparatus 200 of the beam information indicating the appropriate directional beam (S445).

Further, the base station 100 transmits the DMRS and the data signal destined for the terminal apparatus 200 by the appropriate directional beam (S447).

The terminal apparatus 200 performs the reception process on the basis of the beam information and the antenna-related information (S449).

Note that the base station 100 may notify the terminal apparatus 200 of other beam information indicating another directional beam together. The other directional beam may be a directional beam that interferes with the appropriate directional beam. Then, the terminal apparatus 200 may perform the reception process further on the basis of the other beam information.

Further, the base station 100 may not notify the terminal apparatus 200 of the beam information. Instead, the terminal apparatus 200 may regard the appropriate directional beam selected by the terminal apparatus 200 as the directional beam for transmitting a signal destined for the terminal apparatus 200.

(2) Antenna Port Allocation Process

Figure 27:
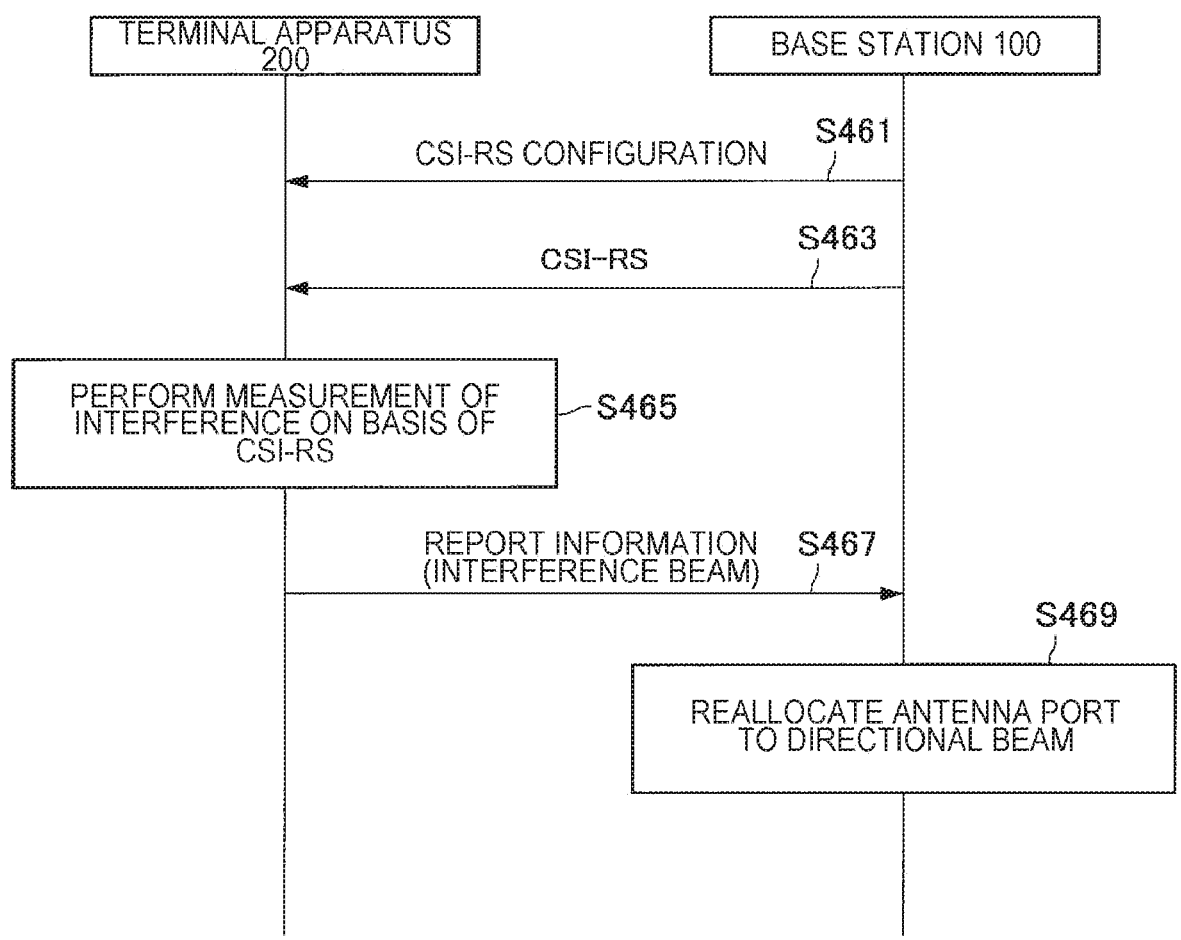
FIG. 27 is a flowchart illustrating an example of a schematic flow of an antenna port allocation process according to the embodiment.

FIG. 27 is a flowchart illustrating an example of a schematic flow of an antenna port allocation process according to the embodiment of the present disclosure.

The base station 100 notifies the terminal apparatus 200 of the CSI-RS configuration (S461). Further, the base station 100 transmits the CSI-RS (S463).

The terminal apparatus 200 performs interference measurement on the basis of the CSI-RS (S465). For example, the terminal apparatus 200 measures reception power of each directional beam on the basis of the CSI-RS. Then, the terminal apparatus 200 reports information indicating one or more directional beams (for example, one or more interference beams) with high reception power to the base station 100 as the report information (S467).

The base station 100 reallocates the antenna port to the directional beam on the basis of the report information from one or more terminal apparatuses 200 (S469).

6. APPLICATION EXAMPLES

The technique according to the present disclosure is applicable to various products. The base station 100 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station. Furthermore, at least some of components of the base station 100 may be realized in a base station apparatus or a module for a base station apparatus.

Further, the terminal apparatus 200 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal apparatus 200 may be implemented as a machine type communication (MTC) for establishing a machine to machine communication (M2M). Furthermore, at least some of components of the terminal apparatus 200 may be implemented as a module (e.g. integrated circuit module constituted with a single die) that is mounted on these terminals.

6.1. Application Examples for Base Station

(1) First Application Example

Figure 28:
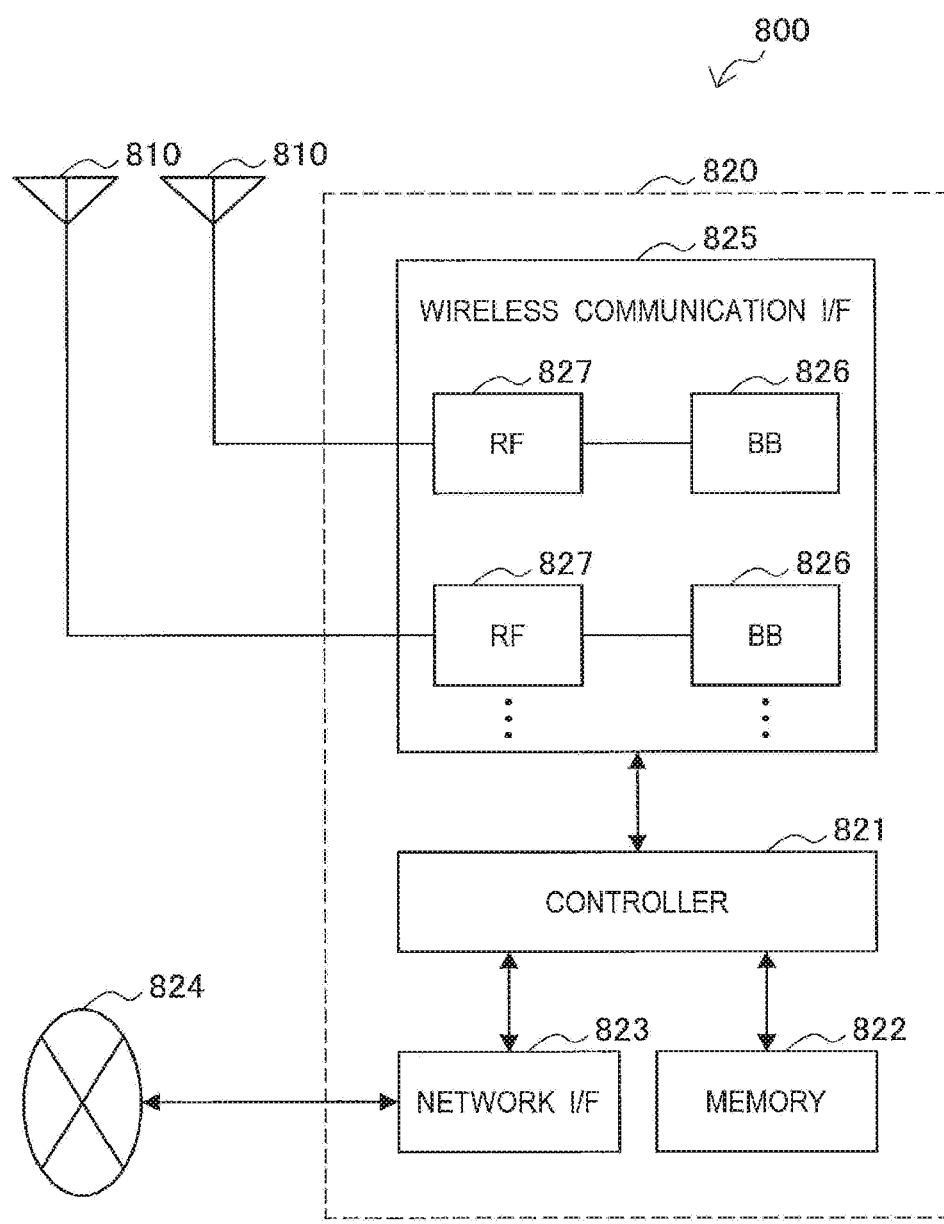
FIG. 28 is a block diagram illustrating a first example of a schematic configuration of an eNB.

FIG. 28 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 28, and the plurality of antennas 810 may, for example, correspond to a plurality of frequency bands used by the eNB 800. It should be noted that while FIG. 28 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 28, and the plurality of BB processors 826 may, for example, correspond to a plurality of frequency bands used by the eNB 800. The wireless communication interface 825 may also include a plurality of the RF circuits 827, as illustrated in FIG. 28, and the plurality of RF circuits 827 may, for example, correspond to a plurality of antenna elements. FIG. 28 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 28, one or more components (the allocating unit 151, the information acquiring unit 153 and/or the notifying unit 155) included in the processing unit 150 described with reference to FIG. 8 may be implemented in the wireless communication interface 825. Alternatively, at least some of the components may be implemented in the controller 821. As an example, the eNB 800 may be equipped with a module including a part (for example, a BB processor 826) or all of the wireless communication interface 825 and/or the controller 821, and the one or more components may be implemented in the module. In this case, the module stores a program causing a processor to function as the one or more components (that is, a program causing the processor to execute operations of the one or more components) and execute the program. As another example, a program causing a processor to function as the one or more components described above may be installed in the eNB 800, and the wireless communication interface 825 (for example, the BB processor 826) and/or the controller 821 may execute the program. As described above, the eNB 800, the base station apparatus 820, or the above module may be provided as an apparatus equipped with the one or more components, and a program causing a processor to function as the one or more components may be provided. Further, a readable recording medium including the above program recorded therein may be provided.

In addition, in the eNB 800 shown in FIG. 28, the wireless communication unit 120 described with reference to FIG. 8 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823.

(2) Second Application Example

Figure 29:
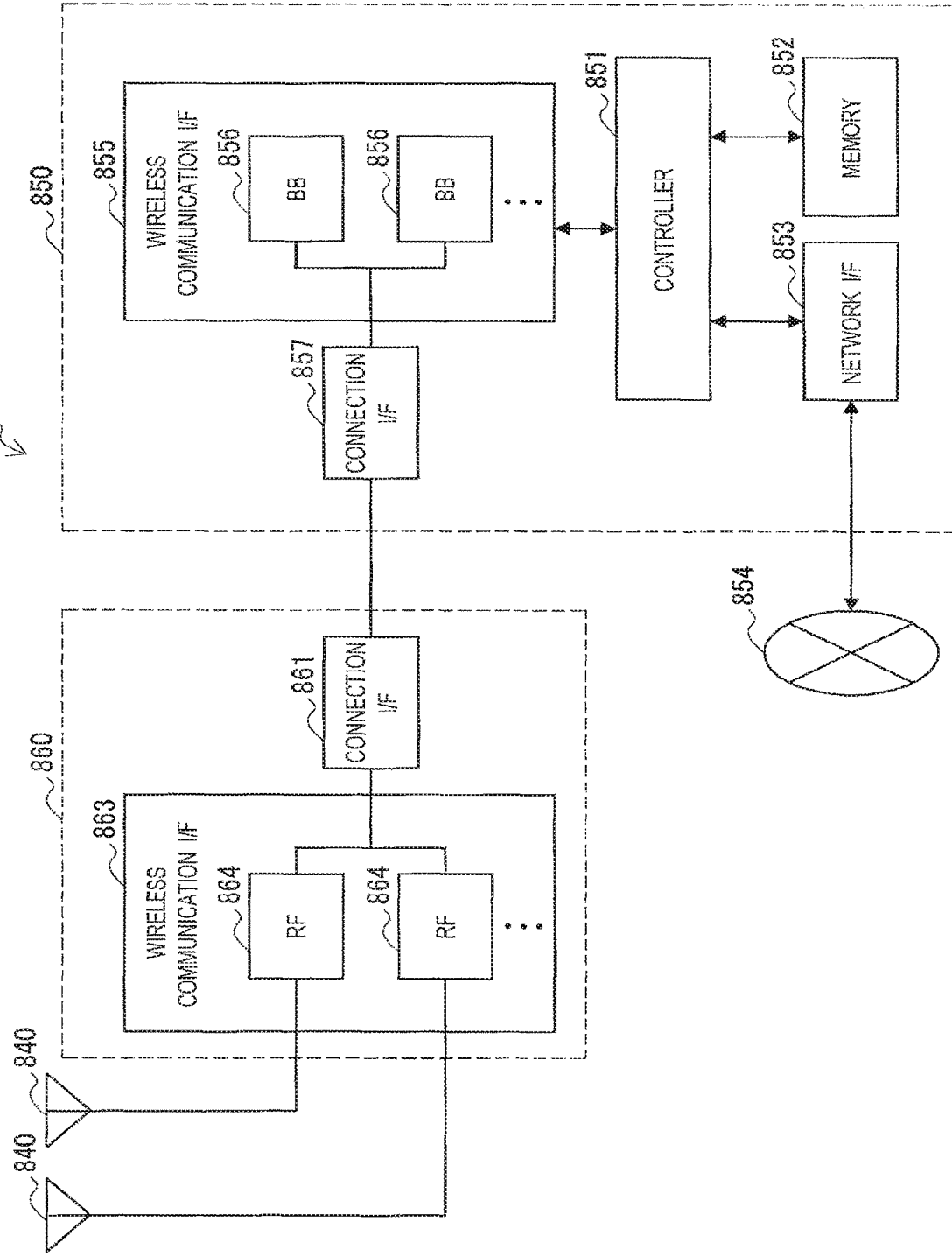
FIG. 29 is a block diagram illustrating a second example of the schematic configuration of the eNB.

FIG. 29 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 29, and the plurality of antennas 840 may, for example, correspond to a plurality of frequency bands used by the eNB 830. FIG. 29 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 28.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 28 except that the BB processor 856 is connected to an RF circuit 864 of the RRH 860 via the connection interface 857. The wireless communication interface 855 may include a plurality of the BB processors 856, as illustrated in FIG. 29, and the plurality of BB processors 856 may, for example, correspond to a plurality of frequency bands used by the eNB 830 respectively. FIG. 29 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 29, and the plurality of RF circuits 864 may, for example, correspond to a plurality of antenna elements. FIG. 29 illustrates an example in which the wireless communication interface 863 includes the plurality of RF circuits 864, but the wireless communication interface 863 may include the single RF circuit 864.

In the eNB 830 illustrated in FIG. 29, one or more components (the allocating unit 151, the information acquiring unit 153 and/or the notifying unit 155) included in the processing unit 150 described with reference to FIG. 8 may be implemented in the wireless communication interface 855 and/or the wireless communication interface 863. Alternatively, at least some of the components may be implemented in the controller 851. As an example, the eNB 830 may be equipped with a module including a part (for example, a BB processor 856) or all of the wireless communication interface 855 and/or the controller 851, and the one or more components may be implemented in the module. In this case, the module stores a program causing a processor to function as the one or more components (that is, a program causing the processor to execute operations of the one or more components) and execute the program. As another example, a program causing a processor to function as the one or more components described above may be installed in the eNB 830, and the wireless communication interface 855 (for example, the BB processor 856) and/or the controller 851 may execute the program. As described above, the eNB 830, the base station apparatus 850, or the above module may be provided as an apparatus equipped with the one or more components, and a program causing a processor to function as the one or more components may be provided. Further, a readable recording medium including the above program recorded therein may be provided.

In addition, in the eNB 830 shown in FIG. 29, the wireless communication unit 120 described with reference to FIG. 8 may be implemented by the wireless communication interface 863 (for example, the RF circuit 864). Moreover, the antenna unit 110 may be implemented by the antenna 840.

In addition, the network communication unit 130 may be implemented by the controller 851 and/or the network interface 853.

6.2. Application Examples for Terminal Apparatus

(1) First Application Example

Figure 30:
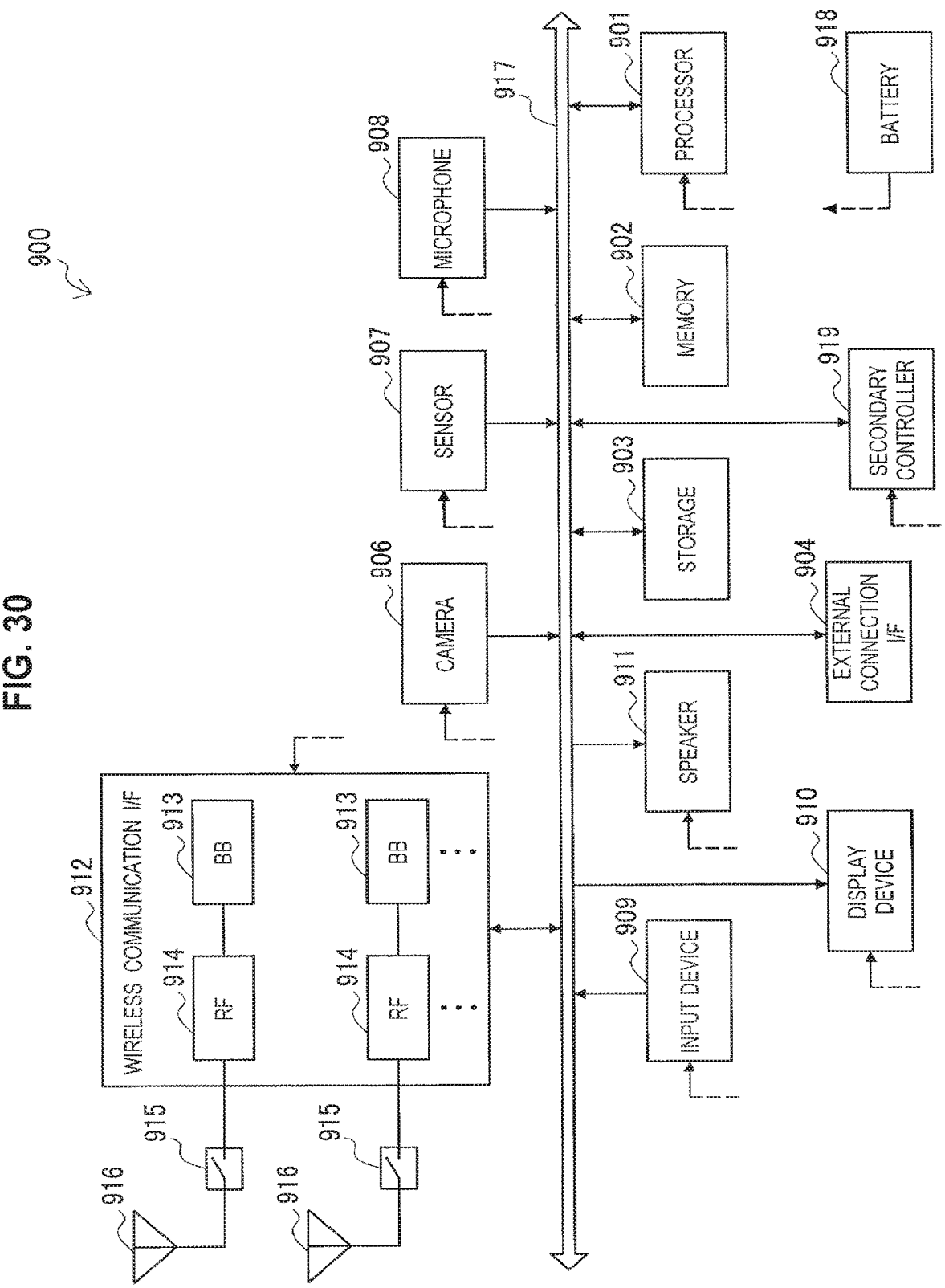
FIG. 30 is a block diagram illustrating an example of a schematic configuration of a smartphone.

FIG. 30 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 30. FIG. 30 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 30. FIG. 30 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 30 via a feeder line that is partially illustrated in the figure as a dashed line. The secondary controller 919, for example, operates a minimally necessary function of the smartphone 900 in a sleep mode.

In the smartphone 900 illustrated in FIG. 30, the information acquiring unit 241 and/or the reception processing unit 243 described above with reference to FIG. 9 may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and the information acquiring unit 241 and/or the reception processing unit 243 may be mounted in the module. In this case, the module may store a program causing the processor to function as the information acquiring unit 241 and/or the reception processing unit 243 (that is, a program causing the processor to perform the operation of the information acquiring unit 241 and/or the reception processing unit 243) and execute the program. As another example, the program causing the processor to function as the information acquiring unit 241 and/or the reception processing unit 243 may be installed in the smartphone 900, and the wireless communication interface 912 (for example, the BB processor 913), the processor 901, and/or the secondary controller 919 may execute the program. As described above, the smartphone 900 or the module may be provided as an apparatus including the information acquiring unit 241 and/or the reception processing unit 243, and the program causing the processor to function as the information acquiring unit 241 and/or the reception processing unit 243 may be provided. A readable recording medium in which the program is recorded may be provided.

In addition, in the smartphone 900 shown in FIG. 30, the wireless communication unit 220 described with reference to FIG. 9 may be implemented by the wireless communication interface 912 (for example, the RF circuit 914). Moreover, the antenna unit 210 may be implemented by the antenna 916.

(2) Second Application Example

Figure 31:
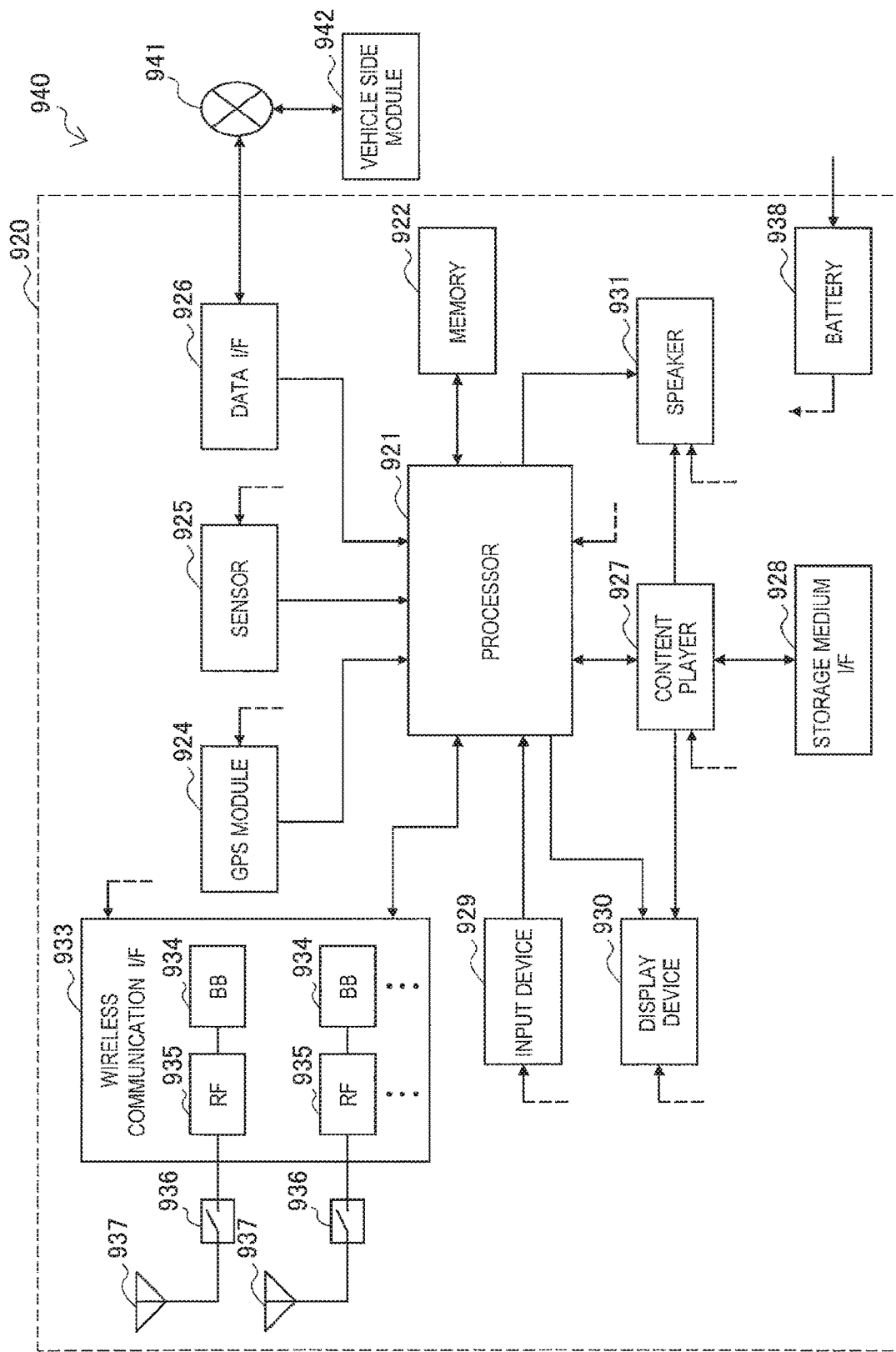
FIG. 31 is a block diagram illustrating an example of a schematic configuration of a car navigation apparatus.

FIG. 31 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and a barometric sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 31. FIG. 31 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 31. FIG. 31 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 31 via a feeder line that is partially illustrated in the figure as a dashed line. The battery 938 accumulates the electric power supplied from the vehicle.

In the car navigation apparatus 920 illustrated in FIG. 31, the information acquiring unit 241 and/or the reception processing unit 243 described above with reference to FIG. 9 may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), and the information acquiring unit 241 and/or the reception processing unit 243 may be mounted in the module. In this case, the module may store a program causing the processor to function as the information acquiring unit 241 and/or the reception processing unit 243 (that is, a program causing the processor to perform the operation of the information acquiring unit 241 and/or the reception processing unit 243) and execute the program. As another example, the program causing the processor to function as the information acquiring unit 241 and/or the reception processing unit 243 may be installed in the car navigation apparatus 920, and the wireless communication interface 933 (for example, the BB processor 934) and/or the processor 921 may execute the program. As described above, the car navigation apparatus 920 or the module may be provided as an apparatus including the information acquiring unit 241 and/or the reception processing unit 243, and the program causing the processor to function as the information acquiring unit 241 and/or the reception processing unit 243 may be provided. A readable recording medium in which the program is recorded may be provided.

In addition, in the car navigation apparatus 920 shown in FIG. 31, the wireless communication unit 220 described with reference to FIG. 9 may be implemented by the wireless communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as a device which includes the information acquiring unit 241 and/or the reception processing unit 243. The vehicle module 942 generates vehicle data such as vehicle speed, engine speed, and trouble information, and outputs the generated data to the in-vehicle network 941.

7. CONCLUSION

So far, each of devices and processes according to embodiments of the present disclosure have been described with reference to FIGS. 7 to 31.

According to the present disclosure, the base station 100 includes the information acquiring unit 153 that acquires the antenna-related information related to the antenna port allocated to the directional beam for transmission by the directional beam and the notifying unit 155 that notifies the terminal apparatus 200 of the antenna-related information.

According to the embodiment of the present disclosure, the terminal apparatus 200 includes the information acquiring unit 241 that acquires the antenna-related information related to the antenna port allocated to the directional beam for transmission by the directional beam and the reception processing unit 243 that performs the reception process.

Accordingly, it is possible to suppress the overhead related to the transmission of the reference signal, for example, when beamforming is performed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although an example is described in which the system is a system that is compliant with LTE, LTE-Advanced, or a communication scheme that conforms to them, the present disclosure is not limited to such an example. For example, the system may be a system that conforms to another communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

In addition, a computer program for causing a processor (for example, a CPU, a DSP, or the like) provided in a device of the present specification (for example, a base station, a base station apparatus or a module for a base station apparatus, or a terminal apparatus or a module for a terminal apparatus) to function as a constituent element of the device (for example, the allocating unit, the information acquiring unit, the notifying unit, the reception processing unit, or the like) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station apparatus or a module for a base station apparatus, or a terminal apparatus or a module for a terminal apparatus) may also be provided. In addition, a method including an operation of the constituent element of the device (for example, the allocating unit, the information acquiring unit, the notifying unit, the reception processing unit, or the like) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An apparatus, including:
  an acquiring unit configured to acquire antenna-related information related to an antenna port allocated to a directional beam for transmission by the directional beam; and
  a notifying unit configured to notify a terminal apparatus of the antenna-related information.

(2) The apparatus according to (1),
  in which the directional beam is a directional beam for transmitting a signal to the terminal apparatus.

(3) The apparatus according to (2),
  in which the acquiring unit acquires other antenna-related information related to an antenna port allocated to another directional beam for transmission by the other directional beam, and
  the notifying unit further notifies the terminal apparatus of the other antenna-related information.

(4) The apparatus according to (1),
  in which the acquiring unit acquires the antenna-related information for each of a plurality of directional beams which are predefined, and
  the notifying unit notifies the terminal apparatus of the antenna-related information for each of the plurality of directional beams.

(5) The apparatus according to any one of (1) to (4),
  in which the antenna-related information includes information indicating the antenna port.

(6) The apparatus according to any one of (1) to (5),
  in which resources for transmitting a reference signal using the antenna port are predefined.

(7) The apparatus according to any one of (1) to (5),
  in which the antenna-related information includes information indicating resources for transmitting a reference signal using the antenna port.

(8) The apparatus according to any one of (1) to (7),
  in which the directional beam is included in a plurality of directional beams which are predefined.

(9) The apparatus according to (8),
  in which the plurality of directional beams include two or more directional beams to which the same antenna port is allocated.

(10) The apparatus according to (9),
  in which the two or more directional beams are directional beams that do not interfere with each other.

(11) The apparatus according to any one of (8) to (10),
  in which the plurality of directional beams include a set of two or more directional beams to which different antenna ports are allocated.

(12) The apparatus according to (11),
  in which the set of two or more directional beams is a set of directional beams that interfere with each other.

(13) The apparatus according to any one of (8) to (12),
  in which the plurality of directional beams include a first directional beam, a second directional beam, and a third directional beam, the first directional beam is adjacent to the second directional beam and the third directional beam, the second directional beam and the third directional beam are not adjacent to each other, the first directional beam is a directional beam to which a first antenna port is allocated, and the second directional beam and the third directional beam are directional beams to which a second antenna port different from the first antenna port is allocated.

(14) The apparatus according to (13), in which the first directional beam is adjacent to the second directional beam and the third directional beam in one of a horizontal direction and a vertical direction, the plurality of directional beams include a fourth directional beam and a fifth directional beam which are adjacent to the first directional beam in the other of the horizontal direction and the vertical direction, the fourth directional beam and the fifth directional beam are not adjacent to each other, and the fourth directional beam and the fifth directional beam are directional beams to which the second antenna port is allocated.

(15) The apparatus according to any one of (8) to (12), in which the plurality of directional beams include a first number of consecutive directional beams, and the first number of consecutive directional beams are directional beams to which the first number of different antenna ports are allocated.

(16) The apparatus according to (15), in which the plurality of directional beams include a second number of consecutive directional beams different from the first number of consecutive directional beams, and the second number of consecutive directional beams are directional beams to which the second number of different antenna ports are allocated.

(17) The apparatus according to any one of (8) to (16), further including an allocating unit configured to dynamically or quasi-statically allocate an antenna port to each of a plurality of directional beams which are predefined.

(18) The apparatus according to (17), in which the allocating unit allocates the antenna port to each of the plurality of directional beams on the basis of interference information reported from the terminal apparatus.

(19) The apparatus according to any one of (1) to (18), in which the antenna port is a virtual antenna corresponding to one or more physical antennas or antenna elements.

(20) An apparatus, including:

an acquiring unit configured to acquire antenna-related information related to an antenna port allocated to a directional beam for transmission by the directional beam; and a reception processing unit configured to perform a reception process on the basis of the antenna-related information.

(21) The apparatus according to (6) or (7), in which the resources are a combination of time/frequency resources and a code sequence.

(22) The apparatus according to (13) or (14), in which one of two arbitrary directional beams which are adjacent to each other among the plurality of directional beams is a directional beam to which the first antenna port is allocated, and the other of the two arbitrary directional beams is a directional beam to which the second antenna port is allocated.

(23) The apparatus according to (15) or (16), in which the consecutive directional beams are consecutive in one of a horizontal direction and a vertical direction.

(24) The apparatus according to any one of (1) to (19), in which the apparatus is a base station, a base station apparatus for the base station or a module for the base station apparatus.

(25) The apparatus according to (20), in which the apparatus is a terminal apparatus or a module for the terminal apparatus.

(26) A method, including:

acquiring, by a processor, antenna-related information related to an antenna port allocated to a directional beam for transmission by the directional beam; and notifying, by the processor, a terminal apparatus of the antenna-related information.

(27) A program causing a processor to execute:

acquiring antenna-related information related to an antenna port allocated to a directional beam for transmission by the directional beam; and notifying a terminal apparatus of the antenna-related information.

(28) A readable recording medium having a program recorded thereon, the program causing a processor to execute:

acquiring antenna-related information related to an antenna port allocated to a directional beam for transmission by the directional beam; and notifying a terminal apparatus of the antenna-related information.

(29) A method, including:

acquiring, by a processor, antenna-related information related to an antenna port allocated to a directional beam for transmission by the directional beam; and performing, by the processor, a reception process on the basis of the antenna-related information.

(30) A program causing a processor to execute:

acquiring antenna-related information related to an antenna port allocated to a directional beam for transmission by the directional beam; and performing a reception process on the basis of the antenna-related information.

(31) A readable recording medium having a program recorded thereon, the program causing a processor to execute:

acquiring antenna-related information related to an antenna port allocated to a directional beam for transmission by the directional beam; and performing a reception process on the basis of the antenna-related information.

REFERENCE SIGNS LIST

1 system
100 base station
101 cell
151 allocating unit
153 information acquiring unit
155 notifying unit
200 base station
241 information acquiring unit
243 reception processing unit

The invention claimed is:

1. An apparatus, comprising:
a wireless communication interface configured to
acquire antenna-related information related to an antenna port allocated to a channel, and
notify a terminal apparatus of the antenna-related information, wherein
the channel is included in a plurality of channels which are predefined and the plurality of channels include two or more channels to which the same antenna port is allocated.

2. The apparatus according to claim 1,
wherein the channel is a channel for transmitting a signal to the terminal apparatus.

3. The apparatus according to claim 2, wherein
the wireless communication interface is further configured to
acquire other antenna-related information related to an antenna port allocated to another channel for transmission by the other channel, and
further notify the terminal apparatus of the other antenna-related information.

4. The apparatus according to claim 1,
wherein the wireless communication interface is further configured to
acquire the antenna-related information for each of a plurality of channels which are predefined, and
notify the terminal apparatus of the antenna-related information for each of the plurality of channels.

5. The apparatus according to claim 1,
wherein the antenna-related information includes information indicating the antenna port.

6. The apparatus according to claim 1,
wherein resources for transmitting a reference signal using the antenna port are predefined.

7. The apparatus according to claim 1,
wherein the antenna-related information includes information indicating resources for transmitting a reference signal using the antenna port.

8. The apparatus according to claim 1,
wherein the two or more channels are channels that do not interfere with each other.

9. The apparatus according to claim 1,
wherein the plurality of channels include a set of two or more channels to which different antenna ports are allocated.

10. The apparatus according to claim 9,
wherein the set of two or more channels is a set of channels that interfere with each other.

11. The apparatus according to claim 1,
wherein the plurality of channels include a first channel, a second channel, and a third channel,
the first channel is adjacent to the second channel and the third channel,
the second channel and the third channel are not adjacent to each other,
the first channel is a channel to which a first antenna port is allocated, and
the second channel and the third channel are channels to which a second antenna port different from the first antenna port is allocated.

12. The apparatus according to claim 11,
wherein the first channel is adjacent to the second channel and the third channel in one of a horizontal direction and a vertical direction,
the plurality of channels include a fourth channel and a fifth channel which are adjacent to the first channel in the other of the horizontal direction and the vertical direction,
the fourth channel and the fifth channel are not adjacent to each other, and
the fourth channel and the fifth channel are channels to which the second antenna port is allocated.

13. The apparatus according to claim 1,
wherein the plurality of channels include a first number of consecutive channels, and
the first number of consecutive channels are channels to which the first number of different antenna ports are allocated.

14. The apparatus according to claim 13,
wherein the plurality of channels include a second number of consecutive channels different from the first number of consecutive channels, and
the second number of consecutive channels are channels to which the second number of different antenna ports are allocated.

15. The apparatus according to claim 1,
the wireless communication interface is further configured to configured to dynamically or quasi-statically allocate an antenna port to each of a plurality of channels which are predefined.

16. The apparatus according to claim 15,
wherein the wireless communication interface is further configured to allocate the antenna port to each of the plurality of channels on the basis of interference information reported from the terminal apparatus.

17. The apparatus according to claim 1,
wherein the antenna port is a virtual antenna corresponding to one or more physical antennas or antenna elements.

18. An apparatus, comprising:
a wireless communication interface configured to
acquire antenna-related information related to an antenna port allocated to a channel for transmission by the channel; and
a reception processor configured to perform a reception process on the basis of the antenna-related information, wherein
the channel is included in a plurality of channels which are predefined and the plurality of channels include two or more channels to which the same antenna port is allocated.

* * * * *